(12) United States Patent
Bredt et al.

(10) Patent No.: US 7,569,273 B2
(45) Date of Patent: Aug. 4, 2009

(54) THERMOPLASTIC POWDER MATERIAL SYSTEM FOR APPEARANCE MODELS FROM 3D PRINTING SYSTEMS

(75) Inventors: James F. Bredt, Watertown, MA (US); Sarah L. Clark, Somerville, MA (US); Derek X. Williams, Exeter, NH (US); Matthew J. DiCologero, Stoneham, MA (US)

(73) Assignee: Z Corporation, Burlington, MA (US)

( * ) Notice: Subject to any disclaimer, the term of this patent is extended or adjusted under 35 U.S.C. 154(b) by 192 days.

(21) Appl. No.: 10/848,831

(22) Filed: May 19, 2004

(65) Prior Publication Data

US 2005/0003189 A1 Jan. 6, 2005

Related U.S. Application Data

(60) Provisional application No. 60/472,221, filed on May 21, 2003.

(51) Int. Cl.
*B32B 5/16* (2006.01)
*B32B 18/00* (2006.01)
*B05D 3/00* (2006.01)
*B05D 1/36* (2006.01)

(52) U.S. Cl. .................. 428/402; 428/323; 428/324; 428/325; 428/326; 428/327; 428/328; 428/329; 428/330; 428/331; 427/189; 427/195; 427/201; 427/203

(58) Field of Classification Search .................. None
See application file for complete search history.

(56) References Cited

U.S. PATENT DOCUMENTS

| | | | |
|---|---|---|---|
| 2,522,548 A | 9/1950 | Streicher | |
| 2,662,024 A | 12/1953 | Riddell et al. | |
| 3,297,601 A | 1/1967 | Maynard et al. | |
| 3,303,147 A | 2/1967 | Elden | |
| 3,309,328 A | 3/1967 | Carroll et al. | |
| 3,476,190 A | 11/1969 | Jenny et al. | |
| 3,525,632 A | 8/1970 | Enoch | |
| 3,821,006 A | 6/1974 | Schwartz | |
| 3,835,074 A | 9/1974 | Desmarais | |
| 3,852,083 A | 12/1974 | Yang | |
| 3,870,538 A | 3/1975 | Burkard et al. | |
| 3,890,305 A | 6/1975 | Weber et al. | |
| 3,926,870 A | 12/1975 | Keegan et al. | |
| 3,930,872 A | 1/1976 | Toeniskoetter et al. | |
| 3,932,923 A | 1/1976 | DiMatteo | |
| 4,041,476 A | 8/1977 | Swainson | |
| 4,042,408 A | 8/1977 | Murray et al. | |
| 4,061,825 A * | 12/1977 | Counsell et al. ....... | 428/355 CP |
| 4,078,229 A | 3/1978 | Swanson et al. | |
| 4,247,508 A | 1/1981 | Housholder | |
| 4,288,861 A | 9/1981 | Swainson et al. | |
| 4,310,996 A | 1/1982 | Mulvey et al. | |
| 4,327,156 A | 4/1982 | Dillon et al. | |
| 4,369,025 A | 1/1983 | von der Weid | |
| 4,443,392 A | 4/1984 | Becker et al. | |
| 4,444,594 A | 4/1984 | Paddison et al. | |
| 4,476,190 A | 10/1984 | Clarke et al. | |
| 4,575,330 A | 3/1986 | Hull | |
| 4,613,627 A | 9/1986 | Sherman et al. | |
| 4,618,390 A | 10/1986 | Powell | |
| 4,649,077 A * | 3/1987 | Lauchenauer ............ | 428/317.1 |
| 4,665,492 A | 5/1987 | Masters | |
| 4,752,352 A | 6/1988 | Feygin | |
| 4,752,498 A | 6/1988 | Fudim | |
| 4,755,227 A | 7/1988 | Sherif et al. | |
| 4,758,278 A | 7/1988 | Tomic | |
| 4,801,477 A | 1/1989 | Fudim | |
| 4,844,144 A | 7/1989 | Murphy et al. | |
| 4,863,538 A | 9/1989 | Deckard | |
| 4,929,402 A | 5/1990 | Hull | |
| 4,938,816 A | 7/1990 | Beaman et al. | |
| 4,940,412 A | 7/1990 | Blumenthal et al. | |
| 4,942,001 A | 7/1990 | Murphy et al. | |
| 4,942,003 A | 7/1990 | Bold et al. | |
| 4,942,060 A | 7/1990 | Grossa et al. | |
| 4,943,928 A | 7/1990 | Campbell et al. | |
| 4,944,817 A | 7/1990 | Bourell et al. | |
| 4,945,032 A | 7/1990 | Murphy et al. | |
| 4,961,154 A | 10/1990 | Pomerantz et al. | |
| 4,996,010 A | 2/1991 | Modrek | |
| 4,996,282 A | 2/1991 | Noren et al. | |
| 4,999,143 A | 3/1991 | Hull et al. | |

(Continued)

FOREIGN PATENT DOCUMENTS

| | | |
|---|---|---|
| CN | 1810492 | 8/2006 |
| CN | 1857930 | 10/2006 |
| DE | 40 12 044 A1 | 10/1991 |
| DE | 197 27 677 | 1/1999 |
| DE | 198 53 834 | 5/2000 |
| DE | 101 58 233 | 3/2003 |
| EP | 0 431 924 | 6/1991 |
| EP | 0 540 203 | 5/1993 |
| EP | 1 226 019 B1 | 7/2002 |

(Continued)

OTHER PUBLICATIONS

Borland, "Characterization of Fundamental and Reticulated Biomedical Polymer Structures Fabricated by Three Dimensional Printing," Thesis, MIT, Jun. 1995.

(Continued)

*Primary Examiner*—Sheeba Ahmed
(74) *Attorney, Agent, or Firm*—Goodwin Procter LLP

(57) ABSTRACT

A materials system and method is provided to enable the formation of articles by three-dimensional printing. The materials system includes thermoplastic particulate filler material that allows the accurate definition of articles that are strong without being brittle.

41 Claims, 2 Drawing Sheets

U.S. PATENT DOCUMENTS

| | | |
|---|---|---|
| 5,009,585 A | 4/1991 | Hirano et al. |
| 5,011,635 A | 4/1991 | Murphy et al. |
| 5,015,312 A | 5/1991 | Kinzie |
| 5,015,424 A | 5/1991 | Smalley |
| 5,017,317 A | 5/1991 | Marcus |
| 5,017,753 A | 5/1991 | Deckard |
| 5,031,120 A | 7/1991 | Pomerantz et al. |
| 5,038,014 A | 8/1991 | Pratt et al. |
| 5,040,005 A | 8/1991 | Davidson et al. |
| 5,051,334 A | 9/1991 | Fan |
| 5,053,090 A | 10/1991 | Beaman et al. |
| 5,058,988 A | 10/1991 | Spence |
| 5,059,021 A | 10/1991 | Spence et al. |
| 5,059,266 A | 10/1991 | Yamane et al. |
| 5,059,359 A | 10/1991 | Hull et al. |
| 5,071,337 A | 12/1991 | Heller et al. |
| 5,071,503 A | 12/1991 | Berman et al. |
| 5,076,869 A | 12/1991 | Bourell et al. |
| 5,076,974 A | 12/1991 | Modrek et al. |
| 5,088,047 A | 2/1992 | Bynum |
| 5,089,184 A | 2/1992 | Hirano et al. |
| 5,089,185 A | 2/1992 | Hirano et al. |
| 5,094,935 A | 3/1992 | Vassiliou et al. |
| 5,096,491 A | 3/1992 | Nagai et al. |
| 5,096,530 A | 3/1992 | Cohen |
| 5,104,592 A | 4/1992 | Hull et al. |
| 5,106,288 A | 4/1992 | Hughes et al. |
| 5,121,329 A | 6/1992 | Crump |
| 5,122,441 A | 6/1992 | Lawton et al. |
| 5,123,734 A | 6/1992 | Spence et al. |
| 5,127,037 A | 6/1992 | Bynum |
| 5,128,235 A | 7/1992 | Vassiliou et al. |
| 5,130,064 A | 7/1992 | Smalley et al. |
| 5,132,143 A | 7/1992 | Deckard |
| 5,133,987 A | 7/1992 | Spence et al. |
| 5,134,569 A | 7/1992 | Masters |
| 5,135,379 A | 8/1992 | Fudim |
| 5,135,695 A | 8/1992 | Marcus |
| 5,137,662 A | 8/1992 | Hull et al. |
| 5,139,338 A | 8/1992 | Pomerantz et al. |
| 5,139,711 A | 8/1992 | Nakamura et al. |
| 5,141,680 A | 8/1992 | Almquist et al. |
| 5,143,663 A | 9/1992 | Leyden et al. |
| 5,143,817 A | 9/1992 | Lawton et al. |
| 5,147,587 A | 9/1992 | Marcus et al. |
| 5,149,548 A | 9/1992 | Yamane et al. |
| 5,151,813 A | 9/1992 | Yamamoto et al. |
| 5,154,762 A | 10/1992 | Mitra et al. |
| 5,155,321 A | 10/1992 | Grube et al. |
| 5,155,324 A | 10/1992 | Deckard et al. |
| 5,157,423 A | 10/1992 | Zur |
| 5,158,858 A | 10/1992 | Lawton et al. |
| 5,164,882 A | 11/1992 | Kanai et al. |
| 5,167,882 A | 12/1992 | Jacobine et al. |
| 5,169,579 A | 12/1992 | Marcus et al. |
| 5,171,490 A | 12/1992 | Fudim |
| 5,173,220 A | 12/1992 | Reiff et al. |
| 5,174,931 A | 12/1992 | Almquist et al. |
| 5,174,943 A | 12/1992 | Hull |
| 5,175,077 A | 12/1992 | Grossa et al. |
| 5,176,188 A | 1/1993 | Quinn et al. |
| 5,182,055 A | 1/1993 | Allison et al. |
| 5,182,056 A | 1/1993 | Spence et al. |
| 5,182,134 A | 1/1993 | Sato |
| 5,182,715 A | 1/1993 | Vorgitch et al. |
| 5,183,598 A | 2/1993 | Helle et al. |
| 5,184,307 A | 2/1993 | Hull et al. |
| 5,192,469 A | 3/1993 | Smalley et al. |
| 5,192,559 A | 3/1993 | Hull et al. |
| 5,198,159 A | 3/1993 | Nakamura et al. |
| 5,203,944 A | 4/1993 | Prinz et al. |
| 5,204,055 A | 4/1993 | Sachs et al. |
| 5,204,124 A | 4/1993 | Secretan et al. |
| 5,204,823 A | 4/1993 | Schlotterbeck |
| 5,207,371 A | 5/1993 | Prinz et al. |
| 5,209,878 A | 5/1993 | Smalley et al. |
| 5,216,616 A | 6/1993 | Masters |
| 5,217,653 A | 6/1993 | Mashinsky et al. |
| 5,234,636 A | 8/1993 | Hull et al. |
| 5,236,637 A | 8/1993 | Hull |
| 5,236,812 A | 8/1993 | Vassiliou et al. |
| 5,238,614 A | 8/1993 | Uchinono et al. |
| 5,238,639 A | 8/1993 | Vinson et al. |
| 5,247,180 A | 9/1993 | Mitcham et al. |
| 5,248,249 A | 9/1993 | Yamamoto et al. |
| 5,248,456 A | 9/1993 | Evans, Jr. et al. |
| 5,252,264 A | 10/1993 | Forderhase et al. |
| 5,256,340 A | 10/1993 | Allison et al. |
| 5,258,146 A | 11/1993 | Almquist et al. |
| 5,260,009 A | 11/1993 | Penn |
| 5,263,130 A | 11/1993 | Pomerantz et al. |
| 5,264,061 A | 11/1993 | Juskey et al. |
| 5,267,013 A | 11/1993 | Spence |
| 5,273,691 A | 12/1993 | Hull et al. |
| 5,275,916 A | 1/1994 | Kato et al. |
| 5,278,442 A | 1/1994 | Prinz et al. |
| 5,279,665 A | 1/1994 | Yunovich et al. |
| 5,281,789 A | 1/1994 | Merz et al. |
| 5,286,573 A | 2/1994 | Prinz et al. |
| 5,287,435 A | 2/1994 | Cohen et al. |
| 5,289,214 A | 2/1994 | Zur et al. |
| 5,296,062 A | 3/1994 | Bourell et al. |
| 5,296,335 A | 3/1994 | Thomas et al. |
| 5,301,415 A | 4/1994 | Prinz et al. |
| 5,303,141 A | 4/1994 | Batchelder et al. |
| 5,306,446 A | 4/1994 | Howe |
| 5,306,447 A | 4/1994 | Marcus et al. |
| 5,316,580 A | 5/1994 | Deckard |
| 5,328,539 A | 7/1994 | Sato |
| 5,338,611 A | 8/1994 | Lause et al. |
| 5,340,433 A | 8/1994 | Crump |
| 5,340,656 A | 8/1994 | Sachs et al. |
| 5,342,566 A | 8/1994 | Schafer et al. |
| 5,342,919 A | 8/1994 | Dickens et al. |
| 5,344,298 A | 9/1994 | Hull |
| 5,345,391 A | 9/1994 | Hull et al. |
| 5,345,414 A | 9/1994 | Nakamura et al. |
| 5,348,693 A | 9/1994 | Taylor et al. |
| 5,352,310 A | 10/1994 | Natter |
| 5,352,405 A | 10/1994 | Beaman et al. |
| 5,355,318 A | 10/1994 | Dionnet et al. |
| 5,358,673 A | 10/1994 | Heller et al. |
| 5,364,889 A | 11/1994 | Quinn et al. |
| 5,365,996 A | 11/1994 | Crook |
| 5,370,692 A | 12/1994 | Fink et al. |
| 5,376,320 A | 12/1994 | Tiefenbacher et al. |
| 5,382,289 A | 1/1995 | Bambauer et al. |
| 5,382,308 A | 1/1995 | Bourell et al. |
| 5,385,772 A | 1/1995 | Slovinsky et al. |
| 5,386,500 A | 1/1995 | Pomerantz et al. |
| 5,387,380 A * | 2/1995 | Cima et al. .................. 264/69 |
| 5,391,072 A | 2/1995 | Lawton et al. |
| 5,391,460 A | 2/1995 | Dougherty et al. |
| 5,393,613 A | 2/1995 | MacKay |
| 5,402,351 A | 3/1995 | Batchelder et al. |
| 5,415,820 A | 5/1995 | Furuta et al. |
| 5,418,112 A | 5/1995 | Mirle et al. |
| 5,426,722 A | 6/1995 | Batchelder |
| 5,429,788 A | 7/1995 | Ribble et al. |
| 5,429,908 A | 7/1995 | Hokuf et al. |
| 5,430,666 A | 7/1995 | DeAngelis et al. |
| 5,432,045 A | 7/1995 | Narukawa et al. |
| 5,433,280 A | 7/1995 | Smith |
| 5,435,902 A | 7/1995 | Andre, Sr. |

| | | | | | |
|---|---|---|---|---|---|
| 5,437,964 A | 8/1995 | Lapin et al. | 5,626,919 A | 5/1997 | Chapman et al. |
| 5,439,622 A | 8/1995 | Pennisi et al. | 5,630,981 A | 5/1997 | Hull |
| 5,447,822 A | 9/1995 | Hull et al. | 5,632,848 A | 5/1997 | Richards et al. |
| 5,450,205 A | 9/1995 | Sawin et al. | 5,633,021 A | 5/1997 | Brown et al. |
| 5,458,825 A | 10/1995 | Grolman et al. | 5,637,169 A | 6/1997 | Hull et al. |
| 5,460,758 A | 10/1995 | Langer et al. | 5,637,175 A | 6/1997 | Feygin et al. |
| 5,461,088 A | 10/1995 | Wolf et al. | 5,639,070 A | 6/1997 | Deckard |
| 5,468,886 A | 11/1995 | Steinmann et al. | 5,639,402 A | 6/1997 | Barlow et al. |
| 5,470,689 A | 11/1995 | Wolf et al. | 5,639,413 A | 6/1997 | Crivello |
| 5,474,719 A | 12/1995 | Fan et al. | 5,640,667 A | 6/1997 | Freitag et al. |
| 5,482,659 A | 1/1996 | Sauerhoefer | 5,641,448 A | 6/1997 | Yeung et al. |
| 5,490,882 A | 2/1996 | Sachs et al. | 5,645,973 A | 7/1997 | Hofmann et al. |
| 5,490,962 A | 2/1996 | Cima et al. | 5,648,450 A | 7/1997 | Dickens et al. |
| 5,491,643 A | 2/1996 | Batchelder | 5,649,277 A | 7/1997 | Greul et al. |
| 5,494,618 A | 2/1996 | Sitzmann et al. | 5,650,260 A | 7/1997 | Onishi et al. |
| 5,495,029 A | 2/1996 | Steinmann et al. | 5,651,934 A | 7/1997 | Almquist et al. |
| 5,495,328 A | 2/1996 | Spence et al. | 5,653,925 A | 8/1997 | Batchelder |
| 5,498,782 A | 3/1996 | Rex | 5,656,230 A | 8/1997 | Khoshevis |
| 5,500,069 A | 3/1996 | Ogue et al. | 5,658,412 A | 8/1997 | Retallick et al. |
| 5,501,824 A | 3/1996 | Almquist et al. | 5,658,712 A | 8/1997 | Steinmann et al. |
| 5,503,785 A | 4/1996 | Crump et al. | 5,659,478 A | 8/1997 | Pennisi et al. |
| 5,503,793 A | 4/1996 | Uchinono et al. | 5,660,621 A | 8/1997 | Bredt |
| 5,506,046 A | 4/1996 | Andersen et al. | 5,660,900 A | 8/1997 | Andersen et al. |
| 5,506,087 A | 4/1996 | Lapin et al. | 5,663,883 A | 9/1997 | Thomas et al. |
| 5,506,607 A | 4/1996 | Sanders, Jr. et al. | 5,665,401 A | 9/1997 | Serbin et al. |
| 5,507,336 A | 4/1996 | Tobin | 5,667,820 A | 9/1997 | Heller et al. |
| 5,510,226 A | 4/1996 | Lapin et al. | 5,672,312 A | 9/1997 | Almquist et al. |
| 5,512,162 A | 4/1996 | Sachs et al. | 5,674,921 A | 10/1997 | Regula et al. |
| 5,514,232 A | 5/1996 | Burns | 5,676,904 A | 10/1997 | Almquist et al. |
| 5,514,378 A | 5/1996 | Mikos et al. | 5,677,107 A | 10/1997 | Neckers |
| 5,518,680 A | 5/1996 | Cima et al. | 5,684,713 A | 11/1997 | Asada et al. |
| 5,519,816 A | 5/1996 | Pomerantz et al. | 5,688,464 A | 11/1997 | Jacobs et al. |
| 5,525,051 A | 6/1996 | Takano et al. | 5,693,144 A | 12/1997 | Jacobs et al. |
| 5,527,877 A | 6/1996 | Dickens et al. | 5,695,707 A | 12/1997 | Almquist et al. |
| 5,534,059 A | 7/1996 | Immordino, Jr. | 5,697,043 A | 12/1997 | Baskaran et al. |
| 5,534,104 A | 7/1996 | Langer et al. | 5,698,485 A | 12/1997 | Bruck et al. |
| 5,536,467 A | 7/1996 | Reichle et al. | 5,700,406 A | 12/1997 | Menhennett et al. |
| 5,545,367 A | 8/1996 | Bae et al. | 5,703,138 A | 12/1997 | Cantor et al. |
| 5,554,336 A | 9/1996 | Hull | 5,705,116 A | 1/1998 | Sitzmann et al. |
| 5,555,176 A | 9/1996 | Menhennett et al. | 5,705,117 A | 1/1998 | O'Connor et al. |
| 5,555,481 A | 9/1996 | Rock et al. | 5,705,316 A | 1/1998 | Steinmann et al. |
| 5,556,590 A | 9/1996 | Hull | 5,707,578 A | 1/1998 | Johnson et al. |
| 5,569,349 A | 10/1996 | Almquist et al. | 5,707,780 A | 1/1998 | Lawton et al. |
| 5,569,431 A | 10/1996 | Hull | 5,711,911 A | 1/1998 | Hull |
| 5,571,471 A | 11/1996 | Hull | 5,713,410 A | 2/1998 | LaSalle et al. |
| 5,572,431 A | 11/1996 | Brown et al. | 5,717,599 A | 2/1998 | Menhennett et al. |
| 5,573,721 A | 11/1996 | Gillette | 5,718,279 A | 2/1998 | Satoh et al. |
| 5,573,722 A | 11/1996 | Hull | 5,718,757 A | 2/1998 | Guillou et al. |
| 5,573,889 A | 11/1996 | Hofmann et al. | 5,727,138 A | 3/1998 | Harada et al. |
| 5,582,876 A | 12/1996 | Langer et al. | 5,728,345 A | 3/1998 | Hlavaty et al. |
| 5,587,913 A | 12/1996 | Abrams et al. | 5,730,817 A | 3/1998 | Feygin et al. |
| 5,591,563 A | 1/1997 | Suzuki et al. | 5,730,925 A | 3/1998 | Mattes et al. |
| 5,593,531 A | 1/1997 | Penn | 5,731,388 A | 3/1998 | Suzuki et al. |
| 5,594,652 A | 1/1997 | Penn et al. | 5,733,497 A | 3/1998 | McAlea et al. |
| 5,595,597 A | 1/1997 | Fogel et al. | 5,738,817 A | 4/1998 | Danforth et al. |
| 5,595,703 A | 1/1997 | Swaelens et al. | 5,738,921 A | 4/1998 | Andersen et al. |
| 5,596,504 A | 1/1997 | Tata et al. | 5,740,051 A | 4/1998 | Sanders, Jr. et al. |
| 5,597,520 A | 1/1997 | Smalley et al. | 5,746,844 A | 5/1998 | Sterett et al. |
| 5,597,589 A | 1/1997 | Deckard | 5,746,967 A | 5/1998 | Hoy et al. |
| 5,598,340 A | 1/1997 | Medard et al. | 5,749,041 A | 5/1998 | Lakshminarayan et al. |
| 5,599,651 A | 2/1997 | Steinmann et al. | 5,753,171 A | 5/1998 | Serbin et al. |
| 5,603,797 A | 2/1997 | Thomas et al. | 5,753,274 A | 5/1998 | Wilkening et al. |
| 5,605,941 A | 2/1997 | Steinmann et al. | 5,772,947 A | 6/1998 | Hull et al. |
| 5,608,814 A | 3/1997 | Gilmore et al. | 5,783,358 A | 7/1998 | Schulthess et al. |
| 5,609,812 A | 3/1997 | Childers et al. | 5,805,971 A | 9/1998 | Akedo |
| 5,609,813 A | 3/1997 | Allison et al. | 5,851,465 A | 12/1998 | Bredt |
| 5,610,824 A | 3/1997 | Vinson et al. | 5,870,307 A | 2/1999 | Hull et al. |
| 5,611,883 A | 3/1997 | Tompkins et al. | 5,902,441 A * | 5/1999 | Bredt et al. .................. 156/284 |
| 5,614,075 A | 3/1997 | Andre, Sr. | 5,902,537 A | 5/1999 | Almquist et al. |
| 5,616,293 A | 4/1997 | Ashtiani-Zarandi et al. | 5,940,674 A | 8/1999 | Sachs et al. |
| 5,616,294 A | 4/1997 | Deckard | 5,943,235 A | 8/1999 | Earl et al. |
| 5,622,577 A | 4/1997 | O'Connor | 5,965,776 A | 10/1999 | Leppard et al. |
| 5,622,811 A | 4/1997 | Ogue et al. | 5,976,339 A | 11/1999 | André |

| | | | | | | |
|---|---|---|---|---|---|---|
| 6,007,318 | A | 12/1999 | Russell et al. | WO | WO 95/30503 | 11/1995 |
| 6,077,887 | A | 6/2000 | Thuresson et al. | WO | WO-96/06881 | 3/1996 |
| 6,112,109 | A | 8/2000 | D'Urso | WO | WO-97/11835 | 4/1997 |
| 6,136,088 | A | 10/2000 | Farrington | WO | WO 97/26302 | 7/1997 |
| 6,136,948 | A | 10/2000 | Dickens, Jr. et al. | WO | WO 98/09798 | 3/1998 |
| 6,147,138 | A | 11/2000 | Höochsmann et al. | WO | WO 98/28124 | 7/1998 |
| 6,193,922 | B1 | 2/2001 | Ederer | WO | WO 00/26026 | 5/2000 |
| 6,299,677 | B1 | 10/2001 | Johnson et al. | WO | WO 01/34371 | 5/2001 |
| 6,348,679 | B1 | 2/2002 | Ryan et al. | WO | WO-02/38677 | 5/2002 |
| 6,363,606 | B1 | 4/2002 | Johnson, Jr. et al. | WO | WO-02/064354 | 8/2002 |
| 6,375,874 | B1 | 4/2002 | Russell et al. | WO | WO-03/016030 | 2/2003 |
| 6,397,922 | B1 | 6/2002 | Sachs et al. | WO | WO-2004/048463 | 6/2004 |
| 6,403,002 | B1 | 6/2002 | van der Geest | WO | WO-2004/062927 | 7/2004 |
| 6,416,850 | B1 | 7/2002 | Bredt et al. | WO | WO-2004096514 | 11/2004 |
| 6,423,255 | B1 | 7/2002 | Hoechsmann et al. | WO | WO-2005/011959 | 2/2005 |
| 6,433,038 | B1 | 8/2002 | Tanabe et al. | WO | WO-2005/023524 | 3/2005 |
| 6,531,086 | B1 | 3/2003 | Larsson et al. | WO | WO-2005/025074 | 3/2005 |
| 6,540,784 | B2 | 4/2003 | Barlow et al. | WO | WO-2005/090055 | 9/2005 |
| 6,600,142 | B2 | 7/2003 | Ryan et al. | WO | WO-2005/105412 | 11/2005 |
| 6,610,429 | B2 | 8/2003 | Bredt et al. | WO | WO-2007/039450 | 4/2007 |
| 6,713,125 | B1 | 3/2004 | Sherwood et al. | WO | WO-2007/147625 | 12/2007 |
| 6,742,456 | B1 | 6/2004 | Kasperchik et al. | | | |
| 6,780,368 | B2 * | 8/2004 | Liu et al. .................... 264/401 | | | |
| 6,799,959 | B1 | 10/2004 | Tochimoto et al. | | | |
| 6,930,144 | B2 | 8/2005 | Oriakhi | | | |
| 6,989,115 | B2 | 1/2006 | Russell et al. | | | |
| 7,037,382 | B2 | 5/2006 | Davidson et al. | | | |
| 7,087,109 | B2 | 8/2006 | Bredt et al. | | | |
| 7,120,512 | B2 | 10/2006 | Kramer et al. | | | |
| 7,285,234 | B2 | 10/2007 | Pfeifer et al. | | | |
| 7,300,613 | B2 | 11/2007 | Sano et al. | | | |
| 2001/0050031 | A1 | 12/2001 | Bredt et al. | | | |
| 2002/0016387 | A1 | 2/2002 | Shen | | | |
| 2002/0106412 | A1 | 8/2002 | Rowe et al. | | | |
| 2003/0090034 | A1 | 5/2003 | Mulhaupt et al. | | | |
| 2003/0143268 | A1 | 7/2003 | Pryce Lewis et al. | | | |
| 2003/0173695 | A1 | 9/2003 | Monkhouse et al. | | | |
| 2004/0038009 | A1 | 2/2004 | Leyden et al. | | | |
| 2004/0056378 | A1 | 3/2004 | Bredt et al. | | | |
| 2004/0232583 | A1 | 11/2004 | Monsheimer et al. | | | |
| 2005/0001356 | A1 | 1/2005 | Tochimoto et al. | | | |
| 2005/0017394 | A1 | 1/2005 | Hochsmann et al. | | | |
| 2005/0059757 | A1 | 3/2005 | Bredt et al. | | | |
| 2005/0093194 | A1 | 5/2005 | Oriakhi et al. | | | |
| 2005/0110177 | A1 | 5/2005 | Schulman et al. | | | |
| 2005/0179167 | A1 | 8/2005 | Hachikian | | | |
| 2005/0197431 | A1 | 9/2005 | Bredt et al. | | | |
| 2005/0212163 | A1 | 9/2005 | Bausinger et al. | | | |
| 2005/0230870 | A1 | 10/2005 | Oriakhi | | | |
| 2006/0071367 | A1 | 4/2006 | Hunter et al. | | | |
| 2006/0141145 | A1 | 6/2006 | Davidson et al. | | | |
| 2006/0208388 | A1 | 9/2006 | Bredt et al. | | | |
| 2006/0230984 | A1 | 10/2006 | Bredt et al. | | | |
| 2007/0007698 | A1 | 1/2007 | Sano | | | |
| 2007/0029698 | A1 | 2/2007 | Rynerson et al. | | | |

FOREIGN PATENT DOCUMENTS

| | | |
|---|---|---|
| EP | 1 475 221 A | 11/2004 |
| EP | 1491517 | 12/2004 |
| EP | 1498277 A | 1/2005 |
| EP | 1512519 A | 3/2005 |
| EP | 1623816 | 2/2006 |
| GB | 2048235 A | 12/1980 |
| GB | 2155944 A | 10/1985 |
| JP | 3-287683 | 12/1991 |
| JP | 06 289612 | 10/1994 |
| JP | 9-241311 | 9/1997 |
| JP | 11-116875 | 4/1999 |
| JP | 2001-162351 | 6/2001 |
| WO | WO-93/19019 | 9/1993 |
| WO | WO 93/25336 | 12/1993 |
| WO | WO-94/12328 | 6/1994 |

OTHER PUBLICATIONS

Ederer, "A 3D Print Process for Inexpensive Plastic Parts," Presentation for the Austin Solid Freeform Conference, 1995.
German, *Powder Injection Molding*, (1990), pp. 32-43 and 92-95.
Khanuja, "Origin and Control of Anisotropy in Three Dimensional Printing of Structural Ceramics," Thesis, MIT, Feb. 1996.
International Search Report for Int'l Application No. PCT/US04/015644 dated Oct. 24, 2005.
International Preliminary Report on Patentability, Application No. PCT/US2004/015644, Dec. 8, 2005 (7 pages).
Office Action in The People's Republic of China, Application No. 200480018360.9, Oct. 13, 2006 (5 pages).
US 4,937,420, 6/1990, Deckard (withdrawn).
Boyer et al., eds., "Metals Handbook," American Society for Metals, pp. 23.5, 23.8-23.13 (1985).
European Search Report for 03029489.6, Feb. 16, 2004, 3 pgs.
European Search Report for European Application No. 04 00 1558, Apr. 27, 2006, 5 pgs.
Examination report for European patent Application No. 00 976 896.1-2307, Jan. 28, 2003 (5 pages).
Examination report in Canadian Patent Application No. 2,338,617, mailed Aug. 17, 2007 (2 pages).
Grant, Julius, Editor, "Hackh's Chemical Dictionary" Fourth Edition (1972, McGraw-Hill Book Company, New York), p. 250, "ethyl acetate."
International Preliminary Examination Report for Int'l Application No. PCT/US01/12220, Mar. 14, 2003.
International Preliminary Examination Report for PCT/US97/15041, Oct. 19, 1998, 9 pages.
International Search Report and Written Opinion for PCT/US2004/027549.
International Search Report for PCT/US97/15041, Jan. 12, 1998, 4 pages.
International Search Report for PCT/US99/20628, Jan. 21, 2000, 3 pages.
International Search Report of Int'l Application No. PCT/US01/12220, Apr. 15, 2002.
Official Action from Canadian Intellectual Property Office for Canadian Application Serial No. 2,388,046, dated Apr. 10, 2006.
Written Opinion for PCT/US99/20628, Jul. 27, 2000, 10 pages.
International Search Report for PCT/US03/29714, Feb. 10, 2004, 4 pages.
International Preliminary Report on Patentability for PCT/US2004/027549 (Dec. 6, 2007).
Office Action in Japanese Patent Application No. 549079/98, mailed Nov. 27, 2007, 3 pages.
Examination report for European patent Application No. 01 927 008.1, mailed Jan. 23, 2008, 7 pages.
Aranson et al., The Physics of Granular Media, pp. 143-164, Hinrichsen & Wolf, eds. (Wiley-VCH 2004).

Das, Advanced Soil Mechanics, pp. 313-326 (Hemisphere Press Press 1997).
Definition of "Colorant," Hawley's Condensed Chemical Dictionary, 14th Ed. (2001) p. 287.
Invitation to Pay Additional Fees & Partial ISR for PCT/US2007/008046, Sep. 18, 2007 (6 pages).
International Search Report & Written Opinion for PCT/US2007/008046, Nov. 15, 2007, 23 pages.
Adamson, Physical Chemistry of Surfaces, Interscience Publishers, Inc. (1967).
Aranson et al., The Physics of Granular Media, pp. 143-164, Hinrichsen & Wolf, eds. (Wiley-VCH 2004).
Brandup et al., Polymer Handbook, pp. 675-714, John Wiley & Sons (1999).
Das, Advanced Soil Mechanics, pp. 313-326 (Hemisphere Press Press 1997).
Definition of "Colorant," Hawley's Condensed Chemical Dictionary, 14th Ed. (2001) p. 287.
Hamill, Search Report dated Jan. 30, 2008, 2 pages.
Hamill, Search Report dated Jan. 4, 2008, 3 pages.
http://toxics.usgs.gov/definitions/kow.html, printed Jun. 24, 2008.
http://www.cibasc.com/brightening.htm, printed Jun. 24, 2008.
http://www.devicelink.com/mddi/archive/99/09/006.html, printed Jun. 24, 2008.
International Search Report & Written Opinion for PCT/US2007/008046, Nov. 15, 2007, 23 pages.
International Search Report & Written Opinion for PCT/US2007/025075, mailed Jun. 12, 2008.
International Search Report & Written Opinion for PCT/US2008/000366, mailed Jun. 20, 2008.
Invitation to Pay Additional Fees & Partial ISR for PCT/US2007/008046, Sep. 18, 2007 (6 pages).
Knapczyk, "Polyallyl Glycidyl Ether Resins for Very Fast Curing High Performance Coatings," 65th Ann. Meeting of Feder. of Soc. for Coating Tech., Oct. 1987, 16 pages.
Pizzi et al., *Handbook of Adhesive Technology*, pp. 761-773, Marcel Dekker, Inc. (2003)..
Rulison, "Wettability Studies for Porous Solids Including Powders and Fibrous Materials-Technical Notice # 302," (1996).

* cited by examiner

THERMOPLASTIC POWDER MATERIAL SYSTEM FOR APPEARANCE MODELS FROM 3D PRINTING SYSTEMS

RELATED APPLICATIONS

This application claims the benefit of U.S. Provisional Application 60/472,221 filed May 21, 2003, the entire disclosure of which is hereby incorporated by reference.

FIELD OF THE INVENTION

This invention relates generally to rapid prototyping techniques and, more particularly, to a three-dimensional printing material and method using thermoplastic particulate mixtures.

BACKGROUND

The field of rapid prototyping involves the production of prototype articles and small quantities of functional parts, as well as structural ceramics and ceramic shell molds for metal casting, directly from computer-generated design data.

Two well-known methods for rapid prototyping include a selective laser sintering process and a liquid binder three-dimensional printing process. These techniques are similar to the extent that they both use layering techniques to build three-dimensional articles. Both methods form successive thin cross-sections of the desired article. The individual cross-sections are formed by bonding together adjacent grains of a granular material on a generally planar surface of a bed of the granular material. Each layer is bonded to a previously formed layer to form the desired three-dimensional article at the same time as the grains of each layer are bonded together. The laser-sintering and liquid binder techniques are advantageous, because they create parts directly from computer-generated design data and can produce parts having complex geometries. Moreover, three-dimensional printing can be quicker and less expensive than machining of prototype parts or production of cast or molded parts by conventional "hard" or "soft" tooling techniques, that can take from a few weeks to several months, depending on the complexity of the item.

Three-dimensional printing has been used to make ceramic molds for investment casting, to produce fully functional cast metal parts. Additional uses are contemplated for three-dimensional printing. For example, three-dimensional printing may be useful in design-related fields for visualization, demonstration, and mechanical prototyping. It may also be useful for making patterns for molding processes. Three-dimensional printing techniques may be further useful, for example, in the fields of medicine and dentistry, where expected outcomes may be modeled prior to performing procedures. Other businesses that may benefit from rapid prototyping technology include architectural firms, as well as others in which visualization of a design is useful.

A selective laser sintering process is described in U.S. Pat. No. 4,863,568, incorporated herein by reference in its entirety. The selective laser sintering process has been commercialized by DTM Corporation. The selective laser sintering process involves spreading a thin layer of powder onto a flat surface. The powder is spread using a tool developed for use with the selective laser sintering process, known in the art as a counter-rolling mechanism or counter-roller. Using the counter-roller allows thin layers of material to be spread relatively evenly, without disturbing previous layers. After the layer of powder is spread onto the surface, a laser is used to direct laser energy onto the powder in a predetermined two-dimensional pattern. The laser sinters or fuses the powder together in the areas impinged upon by the laser beam energy. The powder may be plastic, metal, polymer, ceramic or a composite. Successive layers of powder are spread over previous layers using the counter-roller, followed by sintering or fusing with the laser. The process is essentially thermal, requiring delivery by the laser of a sufficient amount of energy to sinter the powder together, and to previous layers, to form the final article.

An early three-dimensional printing technique, described in U.S. Pat. No. 5,204,055, incorporated herein by reference in its entirety, describes the use of an ink-jet style printing head to deliver a liquid or colloidal binder material to sequentially applied layers of powdered material. The three-dimensional ink-jet printing technique or liquid binder method involves applying a layer of a powdered material to a surface using a counter-roller. After the powdered material is applied to the surface, the ink-jet printhead delivers a liquid binder in a predetermined pattern to the layer of powder. The binder infiltrates into gaps in the powder material and hardens to bond the powder material into a solidified layer. The hardened binder also bonds each layer to the previous layer. After the first cross-sectional portion is formed, the previous steps are repeated, building successive cross-sectional portions until the final article is formed. Optionally, an adhesive can be suspended in a carrier that evaporates, leaving the hardened adhesive behind. The powdered material may be ceramic, metal, plastic or a composite material, and may also include fibers. The liquid binder material may be organic or inorganic. Typical organic binder materials used are polymeric resins or ceramic precursors, such as polycarbosilazane. Inorganic binders are used where the binder is incorporated into the final articles; silica is typically used in such an application.

One advantage of using an ink-jet print head, rather than a laser, is that a plurality of spray nozzles used to deliver binder to the powder may be arranged side-by-side in a single print head. In selective laser sintering machines, only one laser is conventionally used to deliver energy to the powder. The combination of several spray nozzles increases the speed of liquid binder printing in comparison to laser-sintering, by allowing a larger area to be printed at one time. In addition, liquid binder printing equipment is much less expensive than the laser equipment, due to the high cost of the laser and the high cost of the related beam deflection optics and controls.

The powders, especially metallic powders, presently used in both selective laser sintering and liquid binder techniques present safety issues that may render them undesirable for use in an office environment. These safety issues may require special clothing and processing facilities to prevent, for example, skin contact or inhalation of toxic materials. In addition, more expense may be incurred through complying with regulations for the disposal of toxic materials. For these reasons, these techniques do not lend themselves to being used in typical office environments, such as architectural and design firms, or doctor's offices.

Another three-dimensional printing technique, described in U.S. Pat. Nos. 5,902,441 and 6,416,850, both references incorporated herein by reference in their entirety, utilizes a powder mixture containing a filler and an activatable adhesive in conjunction with an aqueous fluid that activates the adhesive to bind the filler. The fluid is applied by an ink-jet printhead. The filler and adhesive may each include non-toxic materials such as, for example, water-soluble polymers, carbohydrates, sugars, sugar alcohols, proteins, and some inorganic compounds.

There exists a need in the art for a materials system and method that enables the quick, reliable, safe, and inexpensive fabrication of appearance models and small batches of functional parts in an office environment. Such appearance models and parts need to have good-quality surfaces, to be accurately defined, and to be strong without being brittle. Furthermore, some kinds of models need specific mechanical properties such as flexibility for snap-fits or impact toughness.

SUMMARY

The present invention is directed to a materials system and method that satisfies the need for a quick, reliable, safe, and inexpensive method for producing both appearance models and small numbers of functional parts in an office environment. The materials system includes thermoplastic particulate material, allowing the fabrication of appearance models and functional parts that are accurately defined, are strong and tough without being brittle, and have smooth surface finishes with, optionally, thin walls. Thermoplastic materials are used very widely for engineering and consumer products. These materials, therefore, are particularly attractive for prototyping, because they are typically also used in the final manufacturing method.

In an aspect, the invention features a powder adapted for three-dimensional printing. The powder includes a blend of a thermoplastic particulate material, and an adhesive particulate material, with the adhesive particulate material being adapted to bond the thermoplastic particulate material when a fluid activates the adhesive particulate material.

One or more of the following features may be included. The fluid may be aqueous, non-aqueous, and/or non-halogenated. The adhesive particulate material may include the thermoplastic particulate material, so that the thermoplastic particulate material is at least sparingly soluble and adhesive in the activating fluid and is adapted to bond together when the fluid activates the thermoplastic particulate material by at least partially dissolving the thermoplastic particulate material, the thermoplastic particulate material including at least one of the following materials: polymethylmethacrylate, polysulfone, polyethersulfone, polyphenylsulfone, polyacrylonitrile, poly(acrylonitrile-butadiene-styrene), polyamides, polycondensates of urea-formaldehyde, polystyrene; polyolefin, polyvinyl butyral, polycarbonate, polyvinyl chloride, polyethylene terephthalate, ethyl cellulose, hydroxyethyl cellulose, hydroxypropyl cellulose, methyl cellulose, cellulose acetate, hydroxypropylmethyl cellulose, hydroxybutylmethyl cellulose, hydroxyethylmethyl cellulose, ethylhydroxyethyl cellulose, cellulose xanthate, and combinations and copolymers thereof.

The fluid that activates the thermoplastic particulate material may be adapted to be solidifiable by exposure to at least one of ultraviolet light, visible light, heat, and an electron beam. The thermoplastic particulate material may include particles having a mean particle diameter of about 10 micrometers to about 100 micrometers.

The thermoplastic particulate material may include at least one of acetal polyoxymethylene, polylactide, polyethylene, polypropylene, ethylene vinyl acetate, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfone, polyethersulfone, polyphenylsulfone, polyacrylonitrile, poly(acrylonitrile-butadiene-styrene), polyamide, polycondensates of urea-formaldehyde, polystyrene, polyolefin, polyvinyl butyral, polycarbonate, polyvinyl chlorides, polyethylene terephthalate, ethyl cellulose, hydroxyethyl cellulose, hydroxypropyl cellulose, methyl cellulose, cellulose acetate, hydroxypropylmethyl cellulose, hydroxybutylmethyl cellulose, hydroxyethylmethyl cellulose, ethylhydroxyethyl cellulose, cellulose xanthate, and combinations and copolymers thereof.

The adhesive particulate material may include particles having a mean particle diameter of about 10 micrometers to about 100 micrometers.

The adhesive particulate material may include a resin, such as a water-soluble resins or an alkaline-reducible resin, and the fluid may activate the adhesive particulate material by dissolving the adhesive particulate material. The resin may include at least one of the following materials: polyvinyl alcohol, sulfonated polyester polymer, sulfonated polystyrene, octylacrylamide/acrylate/butylaminoethyl methacrylate copolymer, acrylates/octylacrylamide copolymer, polyacrylic acid, polyvinyl pyrrolidone, styrenated polyacrylic acid, polyethylene oxide, sodium polyacrylate, sodium polyacrylate copolymer with maleic acid, polyvinyl pyrrolidone copolymer with vinyl acetate, butylated polyvinylpyrrolidone, polyvinyl alcohol-co-vinyl acetate, starch, modified starch, cationic starch, pregelatinized starch, pregelatinized modified starch, pregelatinized cationic starch, and combinations and copolymers thereof.

The adhesive may include an inorganic adhesive, such as at least one of plaster, bentonite, precipitated sodium silicate, amorphous precipitated silica, amorphous precipitated calcium silicate, amorphous precipitated magnesium silicate, amorphous precipitated lithium silicate, salt, portland cement, magnesium phosphate cement, magnesium oxychloride cement, magnesium oxysulfate cement, zinc phosphate cement, zinc oxide-eugenol cement, aluminum hydroxide, magnesium hydroxide, calcium phosphate, sand, wollastonite, dolomite, amorphous precipitated silicates containing at least two types of ions selected from the group of sodium ions, lithium ions, magnesium ions, and calcium ions, and combinations thereof.

The powder may include a filler material, and the filler material may include particles having a mean particle diameter of about 5 micrometers to about 100 micrometers. The filler material may include an inorganic material, such as aluminum oxide, soda-lime glass, borosilicate glass, silica, aluminosilicate ceramic, limestone, plaster, bentonite, precipitated sodium silicate, amorphous precipitated silica, amorphous precipitated calcium silicate, amorphous precipitated magnesium silicate, amorphous precipitated lithium silicate, salt, portland cement, magnesium phosphate cement, magnesium oxychloride cement, magnesium oxysulfate cement, zinc phosphate cement, zinc oxide-eugenol cement, aluminum hydroxide, magnesium hydroxide, calcium phosphate, sand, wollastonite, dolomite, amorphous precipitated silicates containing at least two type of ions selected from the group of sodium ions, lithium ions, magnesium ions, and calcium ions, and combinations thereof.

The filler material may include an organic material. The organic material may include a carbohydrate, such as starch, modified starch, cellulose, maltodextrin, acacia gum, locust bean gum, pregelatinized starch, acid-modified starch, hydrolyzed starch, sodium carboxymethylecellulose, sodium alginate, hydroxypropyl cellulose, methyl cellulose, chitosan, carrageenan, pectin, agar, gellan gum, gum Arabic, xanthan gum, propylene glycol alginate, guar gum, and combinations thereof. The organic material may include a protein, such as gelatin, rabbit-skin glue, soy protein, and combinations thereof.

The powder may include a processing aid material, such as a viscous liquid and/or a polymer having a low melting point. The processing aid material may include at least one of the following materials: polyethylene glycol, polypropylene glycol, sorbitan monolaurate, sorbitan monooleate, sorbitan trioleate, polysorbate, poly(ethylene oxide) modified silicone, poly (propylene oxide) modified silicone, secondary ethoxylated alcohols, ethoxylated nonylphenols, ethoxylated octylphenols, $C_8$-$C_{10}$ alcohols, $C_8$-$C_{10}$ acids, polyethylene oxide modified acetylenic diols, citronellol, ethoxylated silicones, ethylene glycol octanoate, ethylene glycol decanoate, ethoxylated derivatives of 2,4,7,9-tetramethyl-5-decyne-4,7-diol, polyoxyethylene sorbitan mono-oleate, polyethylene glycol, soybean oil, mineral oil, fluroalkyl polyoxyethylene polymers, glycerol triacetate, oleyl alcohol, oleic acid, squalene, squalane, essential oils, esters, terpenes, greases, or waxes, propylene glycol, ethylene glycol, $C_8$-$C_{10}$ esters of mono, di, or triglycerides, fatty acids, ethoxylated fatty acids, lecithin, modified lecithins, glycerol tributyrate, sodium stearoyl lactylate, diacetyl tartaric esters of mono- and diglycerides, corn syrup, and combinations thereof.

The powder may include a reinforcing fiber. The reinforcing fiber may include at least one of the following materials: natural polymers, modified natural polymers, synthetic polymers, ceramic, cellulose fiber, silicon carbide fiber, graphite fiber, aluminosilicate fiber, polypropylene fiber, fiberglass, polyamide flock, cellulose, rayon, polyvinylalcohol, and combinations thereof.

The powder may include approximately 50-100% thermoplastic particulate material, 0-20% filler material, 0-30% adhesive particulate material, and 0-2% processing aid material.

In another aspect, the invention features a fluid for three-dimensional printing, the fluid including a first solvent having a first boiling point. The fluid is adapted to activate an adhesive in a powder comprising a blend of a thermoplastic particulate material and an adhesive particulate material.

One or more of the following features may be included. The fluid may be adapted to activate the adhesive by dissolving the adhesive particulate material. The first solvent may include one or more of the following materials: ethanol, isopropanol, n-propanol, methanol, n-butanol, a glycol, an ester, a glycol-ether, a ketone, an aromatic, an aliphatic, an aprotic polar solvent, a terpene, an acrylate, a methacrylate, a vinylether, an oxetane, an epoxy, a low molecular weight polymer, carbonate, n-methylpyrrolidone, acetone, methyl ethyl ketone, dibasic esters, ethyl acetate, dimethyl sulfoxide, dimethyl succinate, and combinations thereof.

The fluid may include a second solvent having a second boiling point. The second boiling point may be higher than the first boiling point, and/or the second solvent may be water-miscible. The second solvent may include one or more of the following materials: butyrolactone, glycerol carbonate, propylene carbonate, ethylene carbonate, dimethyl succinate, dimethyl sulfoxide, n-methyl pyrrolidone, glycerol, 1,4butane diol, polyethylene glycol, diethylene glycol butyl ether, ethylene glycol, diethylene glycol, propylene glycol, polypropylene glycol, polyethylene glycol ethers, polypropylene glycol ethers, tetraethyleneglycol ethers, butylene carbonate, pentanediol, hexanediol, and combinations thereof.

The fluid may include water. The first solvent may be water-miscible. The second solvent may be water-miscible. The second solvent may have a second boiling point that is higher than the first boiling point.

The fluid may include a surfactant. The surfactant may include at least one of the following materials: polyethylene oxide modified acetylenic diols, secondary ethoxylated alcohols, ethoxylated nonylphenols, ethoxylated silicones, ethoxylated fluorinated surfactants, ethoxylated tetramethyldecynediol, ethoxylated tetramethyldodecynediol, polyether-modified polysiloxanes, ethoxylated sorbitan monolaurate, octyl phenoxypolyethoxy-polypropoxy-propanol, sulfonated fatty acids, zwitterionic betaines, sodium di-octyl sulfosuccinate, dimethyl dodecylammoniopropane sulfonate, sodium lauryl sulfate, sodium lauryl benzene sulfonate, sodium p-toluene sulfonate, sodium benzoate, sodium benzene sulfonate, potassium sorbate, sodium 2-ethylhexyl sulfonate, and combinations thereof.

The fluid may include a rheology modifier. The rheology modifier may include at least one of the following materials: polyvinylpyrrolidone, polyacrylamide, polyethylene oxide, hydrophobe modified ethoxy urethanes, polyvinyl alcohol, polyacrylic acid, polymethacrylic acid, alkali and ammonium salts of polyacrylic acid, alkali and ammonium salts of polymethacrylic acid, polyvinylpyrrolidone-co-vinyl acetate, butylated polyvinylpyrrolidone, polyvinylalcohol-co-vinyl acetate, and polyacrylic acid-co-maleic anhydride, sulfonated polystyrene, and combinations and copolymers thereof.

The fluid may include an amine. The amine may include at least one of the following materials: monoisopropanol amine, triethylamine, 2-amino-2-methyl-1-propanol, 1-amino-2-propanol, 2-dimethylamino-2-methyl-1-propanol, N,N-diethylethanolamine, N-methyldiethanolamine, N,N-dimethylethanolamine, triethanolamine, 2-aminoethanol, 1-[bis[3-(dimethylamino)propyl]amino]-2-propanol, 3-amino-1-propanol, 2-(2-aminoethylamino)ethanol, tris(hydroxymethyl)aminomethane, 2-amino-2-ethyl-1,3-propanediol, 2-amino-2-methyl-1,3-propanediol, diethanolamine, 1,3-bis(dimethylamino)-2-propanol, ammonium hydroxide, monoethanolamine, aminomethylpropanol, aminoethylethanolamine, triisopropanolamine, polyoxypropylenetriamine, polyethyleneimine, and combinations thereof.

In another aspect, the invention features a fluid for three-dimensional printing, the fluid including a solvent. The fluid is adapted to activate the adhesive properties of at least a sparingly soluble thermoplastic particulate material.

One or more of the following features may be included. The fluid may be non-aqueous, and it may be non-halogenated. The solvent may include at least one of the following materials: an alcohol, a glycol, an ester, a glycol-ether, a ketone, an aromatic, an aliphatic, an aprotic polar solvent, a terpene, an acrylate, a methacrylate, a vinylether, an oxetane, an epoxy, a low molecular weight polymer, carbonate, and combinations thereof.

The alcohol may include at least one of the following materials: methanol, ethanol, n-propanol, i-propanol, n-butanol and combinations thereof. The glycol may include at least one of the following materials: ethylene glycol, diethylene glycol, propylene glycol, polyethyleneglycol, 1,4-butanediol, pentanediol, hexanediol, and combinations thereof.

The ester may include at least one of the following materials: ethyl acetate, propyleneglycol methylether acetate, amyl acetate, dimethylsuccinate, dimethyl glutarate, dimethyl adipate, diethylene glycol monobutyl ether acetate, n-propyl acetate, i-propyl acetate, i-butyl acetate, n-butyl acetate, t-butyl acetate, 2-ethylhexyl acetate, ethylene glycol diacetate, diethyl succinate, methyl lactate, ethyl lactate, dimethyl tartrate, diethyl tartrate and combinations thereof. The glycol-ether may include at least one of the following materials: dipropylene glycol methyl ether, diethylene glycol butyl ether, diethylene glycol monoethyl ether, propylene glycol methyl ether, ethylene glycol propyl ether and combinations thereof.

The ketone may include at least one of the following materials: acetone, methylethylketone, methylisobutylketone, methyl isopropyl ketone, methyl n-propyl ketone, methyl isoamyl ketone, methyl n-amyl ketone, diisobutyl ketone and combinations thereof. The aromatic may include at least one of the following materials: toluene, xylene, phenol, benzene, styrene, high flash aromatic naptha and combinations thereof.

The aliphatic may include at least one of the following materials: hexane, heptane, cyclohexane and combinations thereof. The aprotic polar solvent may include at least one of the following materials: n-methylpyrrolidone, dimethylsulfoxide, 2-pyrrolidone, butyrolactone and combinations thereof. The terpene may include limonene.

The acrylate may include at least one of the following materials: alkoxylated difunctional acrylate, 2-phenoxyethyl acrylate, tetrahydrofurfuryl acrylate, 2(2 ethoxyethoxy)ethyl acrylate, hexanediol diacrylate, propoxylated neopentyl glycol diacrylate, lauryl acrylate, isodecyl acrylate, tridecyl acrylate, isobornyl acrylate, tripropylene glycol diacrylate, stearyl acrylate, allyl acrylate, isooctylacrylate, caprolactone acrylate, alkoxylated tetrahydrofurfuryl acrylate, butanediol diacrylate, 1,3-butyleneglycol diacrylate, diethylene glycol diacrylate, polyethylene glycol diacrylate, alkoxylated hexanediol diacrylate, alkoxylated cyclohexane dimethanol diacrylate, cyclohexane dimethanol diacrylate, dipropylene glycol diacrylate, ethoxylated bisphenol A diacrylate, neopentyl glycol diacrylate, alkoxylated aliphatic diacrylate, trimethylpropane triacrylate, tris (2-hydroxy ethyl) isocyanurate triacrylate, ethoxylated trimethyl propane triacrylate, propoxylated trimethyl propane triacrylate, propoxylated glyceryl triacrylate, pentaerythritol tetraacrylate, pentaerythritol triacrylate, di-trimethylpropane tetraacrylate, dipentaerythritol pentaacrylate, ethoxylated pentaerythritol tetraacrylate, alkoxylated nonyl phenol acrylate, and combinations thereof.

The methacrylate may include at least one of the following materials: 2-phenoxyethyl methacrylate, tetrahydrofurfuryl methacrylate, hexanediol dimethacrylate, lauryl methacrylate, isodecyl methacrylate, tridecyl methacrylate, isobornyl methacrylate, propylene glycol monomethacrylate, stearyl methacrylate, allyl methacrylate, isooctylmethacrylate, butanediol dimethacrylate, 1,3-butyleneglycol dimethacrylate, ethylene glycol dimethacrylate, diethylene glycol dimethacrylate, triethylene glycol dimethacrylate, tetraethylene glycol dimethacrylate, polyethylene glycol dimethacrylate, cyclohexane dimethanol dimethacrylate, dipropylene glycol dimethacrylate, ethoxylated bisphenol A dimethacrylate, neopentyl glycol dimethacrylate, trimethylpropane trimethacrylate, methoxy polyethylene glycol methacrylate, alkoxylated nonyl phenol methacrylate, ethoxylated hydroxyethyl methacrylate, allyl methacrylate, propoxylated allyl methacrylate, and combinations thereof.

The vinyl ether may include at least one of the following materials: hydroxylbutyl vinyl ether, triethyleneglycol divinylether, cyclohexanedimethanol divinylether, propenylether of propylene carbonate, dodecylvinylether, cyclohexanemethanol monovinylether, cyclohexyl vinyl ether, diethyleneglycol divinylether, 2-ethylhexylvinylether, dipropyleneglycol divinylether, tripropyleneglycol divinyl ether, hexanediol divinyl ether, octadecylvinylether, butanediol divinyl ether, bis[4-(vinyloxy)butyl]isophthalate, bis[4-(vinyloxy)butyl]adipate, and combinations thereof.

The oxetane may include at least one of the following materials: 3-ethyl-3-hydroxymethyl-oxetane, 1,4-bis[(3-ethyl-3-oxetanyl methoxy)methyl]benzene, and combinations thereof. The epoxy may include at least one of the following materials: 3,4-epoxycyclohexylmethyl-3,4-epoxycyclohexane carboxylate, bis-(3,4-epoxycyclohexyl) adipate, limonene monoxide, 1,2-epoxyhexadecane, and combinations thereof. The low molecular weight polymer may include polyethyleneimine. The carbonate may include ethylene carbonate, propylene carbonate, butylene carbonate, glycerol carbonate, and combinations thereof.

The fluid may include water and the solvent may include a second solvent having a second boiling point. The second solvent may include at least one of the following materials: butyrolactone, glycerol carbonate, propylene carbonate, ethylene carbonate, dimethyl succinate, dimethyl sulfoxide, n-methyl pyrrolidone, glycerol, 1,4 butane diol, polyethylene glycol, diethylene glycol butyl ether, ethylene glycol, diethylene glycol, propylene glycol, polypropylene glycol, polyethylene glycol ethers, polypropylene glycol ethers, tetraethyleneglycol ethers, butylene carbonate, pentanediol, hexanediol, and combinations thereof.

The fluid may include a surfactant. The surfactant may include at least one of the following materials: polyethylene oxide modified acetylenic diols, secondary ethoxylated alcohols, ethoxylated nonylphenols, ethoxylated silicones, ethoxylated fluorinated surfactants, tetramethyldecynediol, ethoxylated tetramethyldecynediol, ethoxylated tetramethyldodecynediol, polyethermodified polysiloxanes, ethoxylated sorbitan monolaurate, octylphenoxypolyethoxy-polypropoxy-propanol, sulfonated fatty acids, zwitterionic betaines, sodium di-octyl sulfosuccinate, dimethyl dodecylammoniopropane sulfonate, sodium lauryl sulfate, sodium lauryl benzene sulfonate, sodium p-toluene sulfonate, sodium benzoate, sodium benzene sulfonate, potassium sorbate, sodium 2-ethylhexyl sulfonate, and combinations thereof.

The fluid may include a rheology modifier. The rheology modifier may include at least one of the following materials: polyvinylpyrrolidone, polyacrylamide, polyethylene oxide, hydrophobe modified ethoxy urethanes, polyvinyl alcohol, polyacrylic acid, polymethacrylic acid, alkali and ammonium salts of polyacrylic acid, alkali and ammonium salts of polymethacrylic acid, polyvinylpyrrolidone-co-vinyl acetate, butylated polyvinylpyrrolidone, polyvinylalcohol-co-vinyl acetate, and polyacrylic acid-co-maleic anhydride, sulfonated polystyrene, and combinations and copolymers thereof.

The fluid may also include a first solvent having a first boiling point, the first boiling point is lower than the second boiling point. The first solvent may include at least one of the following materials: ethanol, isopropanol, n-propanol, methanol, n-butanol, a glycol, an ester, a glycol-ether, a ketone, an aromatic, an aliphatic, an aprotic polar solvent, a terpene, an acrylate, a methacrylate, a vinylether, an oxetane, an epoxy, a low molecular weight polymer, carbonate, acetone, ethyl acetate, dimethyl succinate, and combinations thereof.

The fluid may include an amine. The amine may include at least one of the following materials: monoisopropanol amine, triethylamine, 2-amino-2-methyl-1-propanol, 1-amino-2-propanol, 2-dimethylamino-2-methyl-1-propanol, N,N-diethylethanolamine, N-methyldiethanolamine, N,N-dimethylethanolamine, triethanolamine, 2-aminoethanol, 1-[bis[3-(dimethylamino)propyl]amino]-2-propanol, 3-amino-1-propanol, 2-(2-aminoethylamino)ethanol, tris(hydroxymethyl)aminomethane, 2-amino-2-ethyl-1,3-propanediol, 2-amino-2-methyl-1,3-propanediol, diethanolamine, 1,3-bis(dimethylamino)-2-propanol, ammonium hydroxide, monoethanolamine, aminomethylpropanol, aminoethylethanolamine, triisopropanolamine, polyoxypropylenetriamine, polyethyleneimine, and combinations thereof.

In another aspect, the invention features a fluid for three-dimensional printing, the fluid including water and an amine, and the fluid is adapted to activate the adhesive properties of at least a sparingly soluble alkaline-reducible particulate material.

One or more of the following features may be included. The amine may include at least one of the following materials: monoisopropanol amine, triethylamine, 2-amino-2-methyl-1-propanol, 1-amino-2-propanol, 2-dimethylamino-2-methyl-1-propanol, N,N-diethylethanolamine, N-methyldiethanolamine, N,N-dimethylethanolamine, triethanolamine, 2-aminoethanol, 1-[bis[3-(dimethylamino)propyl]amino]-2-propanol, 3-amino-1-propanol, 2-(2-aminoethylamino) ethanol, tris(hydroxymethyl)aminomethane, 2-amino-2-ethyl-1,3-propanediol, 2-amino-2-methyl-1,3-propanediol, diethanolamine, 1,3-bis(dimethylamino)-2-propanol, ammonium hydroxide, monoethanolamine, aminomethylpropanol, aminoethylethanolamine, triisopropanolamine, polyoxypropylenetriamine, polyethyleneimine, and combinations thereof.

The fluid may include a first solvent having a first boiling point. The first solvent may include at least one of the following materials: ethanol, isopropanol, n-propanol, methanol, n-butanol, a glycol, an ester, a glycol-ether, a ketone, an aromatic, an aliphatic, an aprotic polar solvent, a terpene, an acrylate, a methacrylate, a vinylether, an oxetane, an epoxy, a low molecular weight polymer, carbonate, acetone, ethyl acetate, dimethyl succinate, and combinations thereof.

The fluid may include a second solvent having a second boiling point, with the second boiling point is higher than the first boiling point. The second solvent may include at least one of the following materials: butyrolactone, glycerol carbonate, propylene carbonate, ethylene carbonate, dimethyl succinate, dimethyl sulfoxide, n-methyl pyrrolidone, glycerol, 1,4 butane diol, polyethylene glycol, diethylene glycol butyl ether, ethylene glycol, diethylene glycol, propylene glycol, polypropylene glycol, polyethylene glycol ethers polypropylene glycol ethers, tetraethyleneglycol ethers, butylene carbonate, pentanediol, hexanediol, and combinations thereof.

The fluid may include a surfactant. The surfactant may include at least one of the following materials: polyethylene oxide modified acetylenic diols, secondary ethoxylated alcohols, ethoxylated nonylphenols, ethoxylated silicones, ethoxylated fluorinated surfactants, tetramethyldecynediol, ethoxylated tetramethyldecynediol, ethoxylated tetramethyldodecynediol, polyethermodified polysiloxanes, ethoxylated fluorocarbons, ethoxylated sorbitan monolaurate, octyl phenoxypolyethoxy-polypropoxy-propanol, sulfonated fatty acids, zwitterionic betaines, sodium di-octyl sulfosuccinate, dimethyl dodecylammoniopropane sulfonate, sodium lauryl sulfate, sodium lauryl benzene sulfonate, sodium p-toluene sulfonate, sodium benzoate, sodium benzene sulfonate, potassium sorbate, sodium 2-ethylhexyl sulfonate, and combinations thereof.

The fluid may include a rheology modifier. The rheology modifier may include at least one of the following materials: polyvinylpyrrolidone, polyacrylamide, polyethylene oxide, hydrophobe modified ethoxy urethanes, polyvinyl alcohol, polyacrylic acid, polymethacrylic acid, alkali and ammonium salts of polyacrylic acid, alkali and ammonium salts of polymethacrylic acid, polyvinylpyrrolidone-co-vinyl acetate, butylated polyvinylpyrrolidone, polyvinylalcohol-co-vinyl acetate, and polyacrylic acid-co-maleic anhydride, sulfonated polystyrene, and combinations and copolymers thereof.

In another aspect, the invention features a method for forming an article by three-dimensional printing. The method includes the steps of: providing a plurality of adjacent particles having a mean diameter of about 10 micrometers to about 100 micrometers, the particles including a blend of a thermoplastic particulate material and an adhesive particulate material; and applying to the plurality of particles a fluid, within which the adhesive particulate material is at least partially soluble and the thermoplastic particulate material is substantially inert, the fluid activating the adhesive particulate material from a substantially inert state, in an amount sufficient to bond the plurality of particles together to define a substantially solid, singular article.

The following features may be included. The article may be heated to at least partially sinter the thermoplastic particulate material.

In another aspect, the invention features a method for forming an article by three-dimensional printing. The method includes the steps of: providing a plurality of adjacent particles having a mean diameter of about 10 micrometers to about 100 micrometers, the particles including a blend of a thermoplastic particulate material and an adhesive particulate material; and applying to the plurality of particles a fluid, within which the adhesive particulate material is at least partially soluble and the thermoplastic particulate material is substantially inert, the fluid dissolving the adhesive particulate material, in an amount sufficient to bond the plurality of particles together to define a substantially solid, singular article.

The following feature may be included. The article may be heated to at least partially sinter the thermoplastic particulate material.

In another aspect, the invention features a method for forming an article by three-dimensional printing. The method includes the steps of applying, to a first portion of a first film of particles that includes a plurality of thermoplastic particles and an activatable adhesive, an aqueous fluid that activates the adhesive in an amount sufficient to form an essentially solid, singular article of adhered particles. A second film of the particles is formed on the first film. The aqueous fluid is applied to a first portion of the second film of particles in an amount sufficient to activate the adhesive to the extent that the particles within the first portion of the second film adhere to each other and to at least a portion of the first portion of the first film to form an essentially solid, singular article from the first portion of the first film and the first portion of the second film.

One or more of the following features may be included. The article may be heated to at least partially sinter the thermoplastic particulate material.

In another aspect, the invention features a method for forming an article by three-dimensional printing. The method includes the steps of: applying, to a first portion of a first film of particles that includes a plurality of thermoplastic particles, a non-aqueous fluid that activates the surface of the thermoplastic particles in an amount sufficient to form an essentially solid, singular article of adhered particles. A second film of the particles is formed on the first film. The non-aqueous fluid is applied, to a first portion of the second film of particles, in an amount sufficient to activate the surface of the thermoplastic particles to the extent that the particles within the first portion of the second film adhere to each other and to at least a portion of the first portion of the first film to form an essentially solid, singular article from the first portion of the first film and the first portion of the second film. At least one of an ultraviolet light, visible light, heat, and an electron beam is applied to the printed layer to induce the non-aqueous fluid to solidify.

In another aspect, the invention features an article including a product of: a powder, the powder including (i) a thermoplastic particulate material, and (ii) an adhesive particulate material, and a fluid that activates the adhesive particulate material to form a substantially solid article composed of the powder, the adhesive particulate material being substantially soluble in the fluid. The article includes a plurality of adjacent layers formed by the product, each layer having a contour defining an edge, and a final shape of the article being defined by respective edges of the layers.

One or more of the following features may be included. The powder may include a filler material and/or a processing aid material. The article may include an infiltrant. The infiltrant may include at least one of the following materials: epoxy-amine systems, free radical UV cure acrylate systems, cationic UV cure epoxy systems, two-part urethane systems including isocyanate-polyol and isocyanate-amine, cyanoacrylate, and combinations thereof.

These and other features, aspects and advantages of the present invention will become better understood with reference to the following description and appended claims.

BRIEF DESCRIPTION OF THE DRAWINGS

The following drawings are not necessarily to scale, emphasis instead being placed generally upon illustrating the principles of the invention. The foregoing and other features and advantages of the present invention, as well as the invention itself, will be more fully understood from the following description of exemplary and preferred embodiments, when read together with the accompanying drawings, in which.

DETAILED DESCRIPTION

Figure 1:
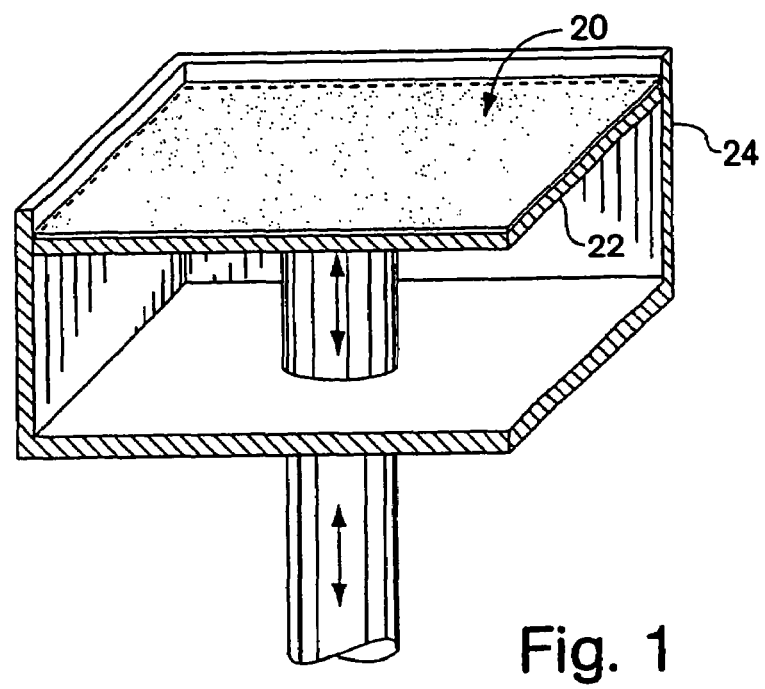
FIG. 1 is a schematic view of a first layer of a mixture of particulate material of an embodiment of the invention deposited onto a downwardly movable surface of a container on which an article is to be built, before any fluid has been delivered.

The present invention relates to a three-dimensional printing material system including a mixture of particles of thermoplastic particulate filler material and an adhesive particulate material, and optionally an additional filler material, a processing aid a reinforcing fiber, and/or a stabilizing fiber; and a fluid adapted to bind the thermoplastic particulate filler material to form an essentially solid article when the fluid activates the adhesive particulate material. The fluid may be aqueous or non-aqueous. As used herein, "aqueous fluid" means a fluid that contains preferably 25% or more water, more preferably 40% or more water, and most preferably 50% or more water. As used herein, "non-aqueous fluid" means a fluid that contains less than 25% water by weight, more preferably less than 10% by weight, and most preferably less than 1% water by weight. If the fluid is non-aqueous, it may include non-halogenated solvents. The present invention also relates to a method of use for such a materials system, and to an article made by the method of the invention. The article of the invention may be formed with excellent accuracy and an exceptional surface finish.

As used herein, "thermoplastic particulate material" is meant to define a filler component that is bonded when the adhesive particulate material is activated by a fluid, the component including a material that may be repeatedly softened by heating and hardened again on cooling. "Adhesive" is meant to define a component that forms a mechanical bridge between components of a network, such as particles, that were separate prior to activation by a fluid, e.g., the thermoplastic particulate material. The formation of the mechanical bridge results in the formation of a solid structure. The adhesive may be a water-soluble resin, and the fluid may activate the adhesive by dissolving the resin. "Resin" is meant to define a material that is a linear or branched chain of organic chemical subunits with a minimum molecular weight of 500 grams per mole. In some embodiments, the adhesive includes the thermoplastic material itself. "Filler" is meant to define a component that is solid prior to application of the activating fluid, which is substantially less soluble in the fluid than the adhesive, and which gives structural integrity to the final article. Fillers in addition to the thermoplastic material may be used, such as various inorganic or organic materials. "Bond" is meant to define the building of a mechanical bridge between separate particles to form a network.

The particulate mixture may include a reinforcing fiber or a reinforcing fibrous component, added to provide structural reinforcement to the final article. As used herein, "fiber" or "fibrous component" is meant to define a component that is solid prior to application of the activating fluid, which may be advantageously, but not necessarily, insoluble in the fluid. The fiber or fibrous component may be added to increase the final article strength. In some embodiments, a stabilizing fiber may be added to the filler to provide dimensional stability to the final article to control the migration of liquid through the bulk powder, and to increase slightly the article strength.

A fiber is a solid component whose primary grains have an average length that is at least 3-4 times longer than their average cross-sectional dimensions. Such materials are very common in industry. For the purposes of three-dimensional printing, fibers are generally useful in a restricted size range, i.e., approximately the thickness of spread layers of powder and smaller.

In some embodiments, a processing aid compound, such as a viscous liquid that serves as a printing aid, may be added to the particulate mixture to prevent or minimize distortions in printing. The processing aid prevents fine particles of the mixture from becoming airborne while the liquid is dispensed from the printhead, which could distort the printed article from the desired configuration.

Referring to FIG. 1, in accordance with a printing method using the materials system of the present invention, a layer or film of particulate material 20 is applied on a linearly movable surface 22 of a container 24. The layer or film of particulate material 20 may be formed in any suitable manner, for example using a counter-roller. The particulate material 20 applied to the surface includes a thermoplastic particulate filler material and an adhesive particulate material. The particulate material 20 may also include an additional filler material, a processing aid material, and/or a fibrous material.

Figure 2:
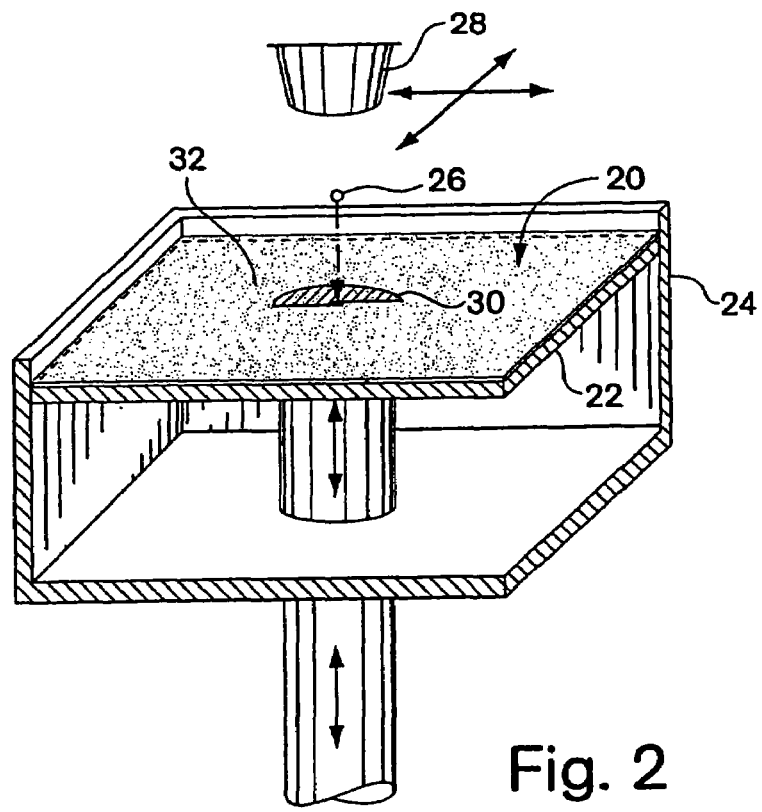
FIG. 2 is a schematic view of an ink-jet nozzle delivering a fluid to a portion of the layer of particulate material of FIG. 1 in a predetermined pattern.

Referring to FIG. 2, an ink-jet style nozzle 28 delivers an activating fluid 26 to at least a portion 30 of the layer or film of the particulate mixture 20 in a two-dimensional pattern. According to the printing method, the fluid 26 is delivered to the layer or film of particulate material 20 in any predetermined two-dimensional pattern (circular, in the figures, for purposes of illustration only), using any convenient mechanism, such as a drop-on-demand (DOD) printhead driven by software in accordance with article model data from a computer-assisted-design (CAD) system.

Figure 3:
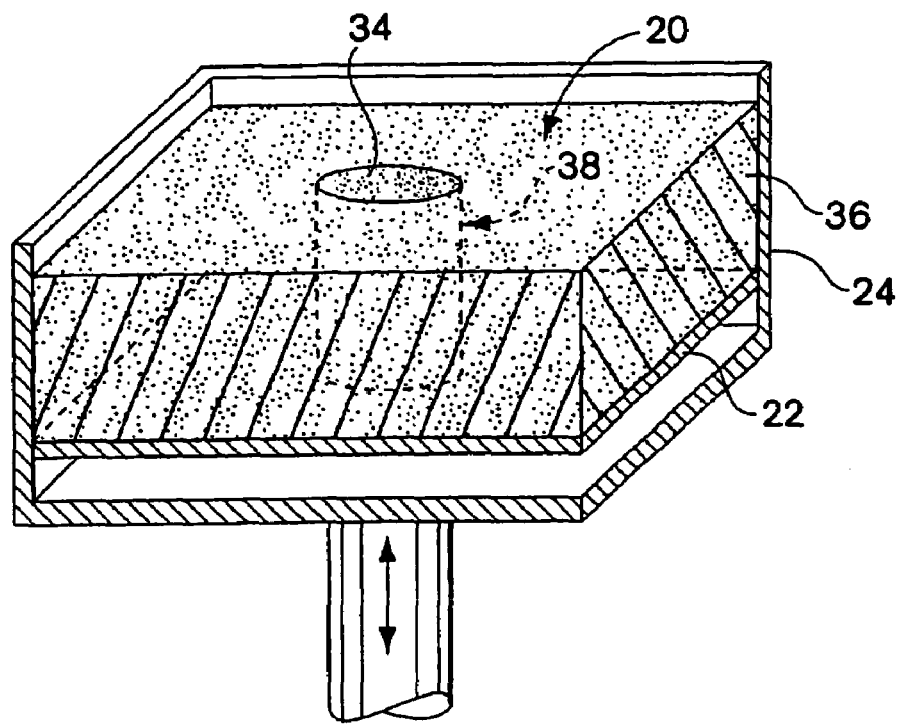
FIG. 3 is a schematic view of a final article of an embodiment of the invention enclosed in the container, the article made by a series of steps illustrated in FIG. 2 and still immersed in the loose unactivated particles.
Figure 4:
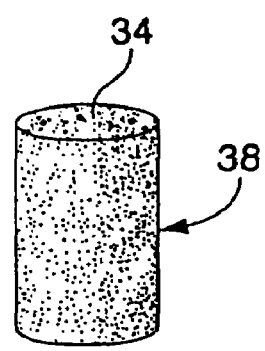
FIG. 4 is a schematic view of the final article of FIG. 3.

The first portion 30 of the particulate mixture is activated by the fluid 26, causing the activated particles to adhere together to form an essentially solid circular layer that becomes a cross-sectional portion of a final article 38 (see, e.g., FIGS. 3 and 4). As used herein, "activates" is meant to define a change in state from essentially inert to adhesive. This definition encompasses the activation of the adhesive particulate material to bond the thermoplastic particulate material and/or at least partially dissolving the thermoplastic particulate material. When the fluid initially comes into contact with the particulate mixture, it immediately flows outwardly (on the microscopic scale) from the point of impact by capillary action, dissolving the adhesive and/or the thermoplastic particulate material within a relatively short time period, such as the first few seconds. A typical droplet of activating fluid has a volume of about 100 picoliters (pl), and spreads to a diameter of about 100 µm after coming into contact with the particulate mixture. As the solvent dissolves the adhesive, the fluid viscosity increases dramatically, arresting further migration of the fluid from the initial point of impact. Within a few minutes, the fluid with adhesive dissolved therein infiltrates the less soluble and slightly porous particles, forming adhesive bonds between the thermoplastic particulate material as well as between the additional filler and the fiber. The activating fluid is capable of bonding together an amount of the particulate mixture that is several times the mass of a droplet of the fluid. As volatile components of the fluid evaporate, the adhesive bonds harden, joining the thermoplastic particulate material and, optionally, additional filler and fiber particulates into a rigid structure, which becomes a cross-sectional portion of the finished article 38.

Any unactivated particulate mixture 32 that was not exposed to the fluid remains loose and free-flowing on the movable surface 22. The unactivated particulate mixture is typically left in place until formation of the final article 38 is complete. Leaving the unactivated, loose particulate mixture in place ensures that the article 38 is fully supported during processing, allowing features such as overhangs, undercuts, and cavities to be defined and formed without the need to use supplemental support structures. After formation of the first cross-sectional portion of the final article 38, the movable surface 22 is indexed downwardly, in this embodiment, and the process is repeated.

Using, for example, a counter-rolling mechanism, a second film or layer of the particulate mixture is then applied over the first layer, covering both the rigid first cross-sectional portion, and any proximate loose particulate mixture. A second application of fluid follows in the manner described above, dissolving the adhesive and forming adhesive bonds between at least a portion of the previous cross-sectional formed portion, the thermoplastic particulate material, and, optionally, additional filler and fiber of the second layer, and hardening to form a second rigid cross-sectional portion added to the first rigid cross-sectional portion of the final article. The movable surface 22 is again indexed downward.

The previous steps of applying a layer of particulate mixture, including the adhesive, applying the activating fluid, and indexing the movable surface 22 downward are repeated until the final article 38 is completed. Referring to FIG. 3, the final article 38 may be any shape, such as cylindrical. At the end of the process, only a top surface 34 of the final article 38 is visible in the container 24. The final article 38 is typically completely immersed in a surrounding bed 36 of unactivated particulate material. Alternatively, an article could be formed in layers upward from an immovable platform, by successively depositing, smoothing, and printing a series of such layers.

Referring to FIG. 4, the unactivated particulate material may be removed from the final cylindrical article 38 by pressurized air flow or a vacuum. After removal of the unactivated particulate material from the final article 38, a post-processing treatment may be performed, such as cleaning, infiltration with stabilizing materials, painting, etc. A suitable infiltrant for stabilizing the materials may be selected from, for example, epoxy-amine systems, free radical UV cure acrylate systems, cationic UV cure epoxy systems, two-part urethane systems including isocyanate-polyol and isocyanate-amine, cyanoacrylate, and combinations thereof. Post-processing may also include heating the article to at least partially sinter the thermoplastic particulate material. Sintering may be done, for example, at 110° C. for about 45 minutes, depending on the constituents in the finished article 38.

The method of the present invention is capable of producing features having dimensions on the order of about 250 micrometers (µm) or more. The accuracy achieved by the method of the present invention is in the range of about ±250 µm. Shrinkage of the final article 38 is about 1%, which may easily be factored into the build to increase accuracy. The surface finish is of fine quality, having a porosity of ~50% and a surface roughness of ~200 µm. Final article 38 may have thin walls with thicknesses of, for example, ~1 millimeter (mm).

Powder Constituents

Thermoplastic Particulate Filler Material

Thermoplastic particulate material is a major component of the materials system of the invention. This particulate material may include any thermoplastic material with a mean particle diameter of about 10 µm to about 100 µm, although sizes outside this range are also contemplated.

Some examples of suitable thermoplastic powder material are:
1) acetal polyoxymethylene;
2) polylactide;
3) polyethylene;
4) polypropylene;
5) ethylene vinyl acetate;
6) polyphenylene ether;
7) ethylene-acrylic acid copolymer;
8) polyether block amide;
9) polyvinylidene fluoride;
10) polyetherketone;
11) polybutylene terephthalate;
12) polyethylene terephthalate;
13) polycyclohexylenemethylene terephthalate;
14) polyphenylene sulfide;
15) polythalamide;
16) polymethylmethacrylate;
17) polysulfones;
18) polyethersulfones;
19) polyphenylsulfones;
20) polyacrylonitrile;
21) poly(acrylonitrile-butadiene-styrene);
22) polyamides;
23) polycondensates of urea-formaldehyde;
24) polystyrene;
25) polyolefin;
26) polyvinyl butyral;
27) polycarbonate;

28) polyvinyl chloride;
29) polyethylene terephthalate;
30) cellulosics including ethyl cellulose, hydroxyethyl cellulose, hydroxypropyl cellulose, methyl cellulose, cellulose acetate, hydroxypropylmethyl cellulose, hydroxybutylmethyl cellulose, hydroxyethylmethyl cellulose, ethylhydroxyethyl cellulose, cellulose xanthate; and combinations and copolymers thereof.

Adhesive

The adhesive particulate material is a compound selected for one or more of the characteristics of high solubility in the activating fluid, low solution viscosity, low hygroscopicity, and high bonding strength. The adhesive is preferably highly soluble in the activating fluid to ensure that it is rapidly and substantially completely incorporated into the fluid. The adhesive is milled very finely prior to admixture with the thermoplastic particulate filler material and/or the filler particles in order to increase the available surface area, enhancing dissolution in the fluid, without being so fine as to cause "caking," an undesirable article characteristic in which unactivated powder spuriously adheres to the outside surface of the part, resulting in poor surface definition. Typical adhesive particle diameters are about 10 µm to about 100 µm. Low hygroscopicity of the adhesive avoids absorption of excessive moisture from the air, which may also contribute to undesirable caking.

In some embodiments, the adhesive of the present invention is water-soluble, i.e., the adhesive dissolves in an aqueous fluid. Compounds suitable for use as the adhesive of the present invention may be selected from the following non-limiting list: water-soluble polymers, alkaline-reducible resin, carbohydrates, sugars, sugar alcohols, proteins, and some inorganic compounds. Water-soluble polymers with low molecular weights may be preferred in some embodiments because they dissolve more quickly due to smaller molecules diffusing more rapidly in solution. Suitable water-soluble resins include:

1) polyvinyl alcohol;
2) sulfonated polyester polymer;
3) sulfonated polystyrene;
4) octylacrylamide/acrylate/butylaminoethyl methacrylate copolymer;
5) acrylates/octylacrylamide copolymer;
6) polyacrylic acid;
7) polyvinyl pyrrolidone;
8) styrenated polyacrylic acid;
9) polyethylene oxide;
10) sodium polyacrylate;
11) sodium polyacrylate copolymer with maleic acid;
12) polyvinyl pyrrolidone copolymer with vinyl acetate;
13) butylated polyvinylpyrrolidone; and
14) polyvinyl alcohol-co-vinyl acetate,
15) starch,
16) modified starch,
17) cationic starch,
18) pregelatinized starch,
19) pregelatinized modified starch,
20) pregelatinized cationic starch, as well as combinations and copolymers thereof.

The adhesive may include carbohydrates such as starch, cellulose, maltodextrin, acacia gum, locust bean gum, pregelatinized starch, acid-modified starch, hydrolyzed starch, sodium carboxymethylcellulose, sodium alginate, hydroxypropyl cellulose, chitosan, carrageenan, pectin, agar, gellan gum, gum Arabic, xanthan gum, propylene glycol alginate, guar gum, and combinations thereof. Suitable sugars and sugar alcohols include sucrose, dextrose, fructose, lactose, polydextrose, sorbitol, xylitol, cyclodextrans, and combinations thereof. Organic compounds including organic acids may also be used, including citric acid, succinic acid, polyacrylic acidurea, and combinations thereof. Organic compounds may also include proteins such as gelatin, rabbit-skin glue, soy protein, and combinations thereof. Inorganic compounds include plaster, bentonite, precipitated sodium silicate, amorphous precipitated silica, amorphous precipitated calcium silicate, amorphous precipitated magnesium silicate, amorphous precipitated lithium silicate, amorphous precipitated silicates containing a combination of two or more of sodium ions, lithium ions, magnesium ions, and calcium ions, salt, portland cement, magnesium phosphate cement, magnesium oxychloride cement, magnesium oxysulfate cement, zinc phosphate cement, zinc oxide-eugenol cement, aluminum hydroxide, magnesium hydroxide, calcium phosphate, sand, wollastonite, dolomite, and combinations thereof.

Thermoplastic as Adhesive

In some embodiments, a separate ingredient to act as the adhesive is not required. The thermoplastic particulate material may be printed on with a fluid in which the thermoplastic particulate is at least sparingly soluble. Examples of thermoplastic particulate materials that may act as an adhesive include:

1) lacetal polyoxymethylene;
2) polylactide;
3) polyethylene;
4) polypropylene;
5) ethylene vinyl acetate;
6) polyphenylene ether;
7) ethylene-acrylic acid copolymer;
8) polyether block amide;
9) polyvinylidene fluoride;
10) polyetherketone;
11) polybutylene terephthalate;
12) polyethylene terephthalate;
13) polycyclohexylenemethylene terephthalate;
14) polyphenylene sulfide;
15) polythalamide;
16) polymethylmethacrylate;
17) polysulfones;
18) polyethersulfones,
19) polyphenylsulfones;
20) polyacrylonitrile;
21) poly(acrylonitrile-butadiene-styrene);
22) polyamides;
23) polycondensates of urea-formaldehyde;
24) polystyrene;
25) polyolefin;
26) polyvinyl butyral;
27) polycarbonate;
28) polyvinyl chloride;
29) polyethylene terephthalate; and
30) cellulosics including ethyl cellulose, hydroxyethyl cellulose, hydroxypropyl cellulose, methyl cellulose, cellulose acetate, hydroxypropylmethyl cellulose, hydroxybutylmethyl cellulose, hydroxyethylmethyl cellulose, ethylhydroxyethyl cellulose, cellulose xanthate, as well as combinations and copolymers thereof.

Filler

The additional filler of the present invention, other than the thermoplastic particulate filler material, is a compound selected for the characteristics of insolubility or extremely low solubility in the activating fluid, rapid wetting, low hygroscopicity, and high bonding strength. The filler provides mechanical structure to the hardened composition. Sparingly soluble filler material is generally advantageous, but insoluble filler material may be used. The filler particles become adhesively bonded together when the adhesive dries/ hardens after the activating fluid has been applied. The filler typically includes a distribution of particle grain sizes, ranging from a practical maximum diameter of about 100 µm downward, to a practical minimum of about 5 µm. Large grain sizes appear to improve the final article quality by forming large pores in the powder through which the fluid may migrate rapidly, permitting production of a more homogeneous material. Smaller grain sizes serve to reinforce article strength. Accordingly, the distribution of grain sizes provides the advantages of both.

Compounds suitable for use as the filler of the present invention may be selected from various general groups, provided that the solubility, hygroscopicity, bonding strength and solution viscosity criteria described above are met. The filler may be inorganic, e.g., aluminum oxide, soda-lime glass, borosilicate glass, silica, aluminosilicate ceramic, limestone, plaster, bentonite, precipitated sodium silicate, amorphous precipitated silica, amorphous precipitated calcium silicate, amorphous precipitated magnesium silicate, amorphous precipitated lithium silicate, amorphous precipitated silicates containing a combination of two or more of sodium ions, lithium ions, magnesium ions, and calcium ions, salt, portland cement, magnesium phosphate cement, magnesium oxychloride cement, magnesium oxysulfate cement, zinc phosphate cement, zinc oxide-eugenol cement, aluminum hydroxide, magnesium hydroxide, calcium phosphate, sand, wollastonite, dolomite, and combinations thereof. Alternatively, the filler may be organic, e.g., a carbohydrate like starch, starch derivatives, cellulose, maltodextrin, and combinations thereof. In general, the selection of the solvent determines which filler may be used. The filler is solid prior to the application of the activating fluid, and is selected so that the filler's solubility in the fluid is substantially less than the adhesive's solubility in the fluid.

Advantageously, the powder constituents, including the filler, have a high absorption capacity and are thereby capable of absorbing and retaining infiltrants.

Fiber

In some embodiments, the particulate mixture may include a reinforcing fiber or a reinforcing fibrous component, added to provide structural reinforcement and structural integrity to the final article. The particulate material may include a plurality of particles of mean diameter of about 10-100 µm. The reinforcing fiber length is generally restricted to a length approximately equal to the thickness of the layer of particulate mixture. The reinforcing fiber length is typically about 60 µm to about 200 µm in length, and is included in an amount not greater than about 50%, by weight, of the total mixture, preferably not greater than 30%, and more preferably not greater than 20%.

The reinforcing fiber of the present invention is preferably either insoluble or substantially slower dissolving than the adhesive in the fluid which activates the adhesive. The reinforcing fiber may be a relatively stiff material chosen to increase the mechanical reinforcement and dimensional control of the final article, without making the powder too difficult to spread. In order to promote wetting of the reinforcing fibers, the chosen fiber advantageously may have a relatively high affinity for the solvent. In one embodiment, a fiber length is approximately equal to the layer thickness, which provides a substantial degree of mechanical reinforcement. Using longer fibers tends to adversely affect the surface finish, and using too much fiber of any length makes spreading the powder increasingly difficult. Fibrous material suitable for reinforcing the present invention includes, but is not limited to, cellulose, polymeric fiber, ceramic fiber, graphite fiber, fiberglass, and combinations thereof. The polymeric fiber may be cellulose and cellulose derivatives or substituted or unsubstituted, straight or branched, alkyl or alkene monomers containing up to eight carbon atoms. Specific useable fibrous materials include, but are not limited to, natural polymers, modified natural polymers, synthetic polymers, ceramic, cellulose fiber, silicon carbide fiber, graphite fiber, aluminosilicate fiber, polypropylene fiber, fiberglass, polyamide flock, cellulose, rayon, polyvinylalcohol, and combinations thereof.

In some embodiments, a stabilizing fiber may be added to the filler to provide dimensional stability to the final article, as well as to increase slightly the article strength. Spreading the particulate mixture with the counter-roller becomes increasingly difficult as friction caused by an excess of stabilizing fiber in the mixture increases, reducing the packing density. Therefore, limiting both the amount and length of the stabilizing fiber increases the packing density of the mixture resulting in finished parts of greater strength. In general, the stabilizing fiber is restricted to a length of less than about half of the reinforcing fiber, in an amount not greater than 50 percent by weight, of the total mixture, preferably not greater than 40 percent by weight, and most preferably not greater than about 30 percent by weight. Optimal values may be determined with routine experimentation using, for example, a counter-roller.

Both the reinforcing fiber and the stabilizing fiber may be cellulose. Some of the useful properties of cellulose making it particularly suitable for use in connection with the invention are low toxicity, biodegradability, low cost, and availability in a wide variety of lengths.

Further considerations in selecting the thermoplastic particulate material, adhesive, filler, and fiber depend on the desired properties of the final article. The final strength of the finished article depends not insubstantially on the quality of the adhesive contacts between the particles of the mixture, and the size of the empty pores that persist in the material after the adhesive has hardened; both of these factors vary with the grain size of the particulate material. In general, the mean size of the grains of particulate material is preferably not larger than the layer thickness. A distribution of grain sizes increases the packing density of the particulate material, which in turn increases both article strength and dimensional control.

Processing Aid

A processing aid for three-dimensional printing is typically a viscous liquid component of the powder material system. It may be a liquid polymer or a polymer having a low melting point. Preferably, it is non-aqueous, thereby not reacting with water-soluble powder components. By loosely bonding the powder, the processing aid keeps the layers from shifting during spreading. The processing aid may also act as a wetting agent, attracting the fluid and allowing the fluid to spread rapidly. Further, the processing aid may reduce dust formation. Examples of materials that may be used as processing aids include polyethylene glycol, polypropylene glycol (PPG), sorbitan monolaurate, sorbitan monooleate, sorbitan trioleate, polysorbate, poly (ethylene oxide) modified silicone, poly (propylene oxide) modified silicone, secondary ethoxylated alcohols, ethoxylated nonylphenols, ethoxylated octylphenols, $C_8$-$C_{10}$ alcohols, $C_8$-$C_{10}$ acids, polyethylene oxide modified acetylenic diols, citronellol, ethoxylated silicones, ethylene glycol octanoate, ethylene glycol decanoate, ethoxylated derivatives of 2,4,7,9-tetramethyl-5-decyne-4,7-diol, polyoxyethylene sorbitan mono-oleate, soybean oil, mineral oil, fluroalkyl polyoxyethylene polymers, glycerol triacetate, oleyl alcohol, oleic acid, squalene, squalane, essential oils, esters, terpenes, greases, waxes, propylene glycol, ethylene glycol, $C_8$-$C_{10}$ esters of mono-, di-, or triglycerides, fatty acids, ethoxylated fatty acids, lecithin, modified lecithins, glycerol tributyrate, sodium stearoyl lactylate, diacetyl tartaric esters of mono- and di-glycerides, corn syrup, and combinations thereof.

Activating Fluid

The fluid of the present invention is selected to comport with the degree of solubility required for the various particulate components of the mixture, as described above. Relatively low solution viscosity ensures that once the adhesive is dissolved in the activating fluid, the fluid migrates quickly to sites in the powder bed to adhesively bond together the thermoplastic filler and reinforcing materials. The fluid may be aqueous or non-aqueous. An aqueous fluid contains preferably 25% or more water, more preferably 40% or more water, and most preferably 50% or more water. A non-aqueous fluid contains less than 25% water by weight, more preferably less than 10% by weight, and most preferably less than 1% water by weight.

First Solvent

The fluid may include a first solvent having a first boiling point in which the adhesive is active, preferably soluble. The first solvent may be adapted to activate the adhesive by dissolving the adhesive particulate material and to assist the dissolution of the fluid. The first solvent may be a non-aqueous material, ethanol, isopropanol, n-propanol, methanol, n-butanol, a glycol, an ester, a glycol-ether, a ketone, an aromatic, an aliphatic, an aprotic polar solvent, a terpene, an acrylate, a methacrylate, a vinylether, an oxetane, an epoxy, a low molecular weight polymer, carbonate, n-methylpyrrolidone, acetone, methyl ethyl ketone, dibasic esters, ethyl acetate, dimethyl sulfoxide, dimethyl succinate, and combinations thereof. Examples of suitable solvents with high boiling points suitable for dissolving certain thermoplastic materials, resulting in the thermoplastic particles adhering together as the solvent dissolves, are:
1) N-methyl pyrrolidone, acetone, methyl ethyl ketone, dibasic esters, and ethyl acetate may be used to dissolve polymethylmethacrylate;
2) Dimethyl sulfoxide and n-methyl pyrrolidone and acetone may be used to dissolve polysulfone, polyethersulfone, and polyphenylsulfone; and
3) Dimethyl sulfoxide and n-methyl pyrrolidone and acetone may be used to dissolve polyacrylonitrile.

Second Solvent (Humectant)

A second solvent (humectant) having a second boiling point that may be higher than the first boiling point may be included in the fluid to retard evaporation of the fluid from the printed material, and to prevent drying/clogging of the printhead delivery system. The second solvent may be water-miscible and may include, for example, butyrolactone, glycerol carbonate, propylene carbonate, ethylene carbonate, dimethyl succinate, dimethyl sulfoxide, n-methyl pyrrolidone, glycerol, 1,4-butanediol, polyethylene glycol, diethylene glycol butyl ether, ethylene glycol, diethylene glycol, propylene glycol, polypropylene glycol, polyethylene glycol ethers, polypropylene glycol ethers, tetraethyleneglycol ethers, butylene carbonate, pentanediol, hexanediol, and combinations thereof.

Surfactant

A surfactant may be added to the fluid to reduce its surface tension, thereby assisting it in slipping through the jets of the printhead. The surfactant may be, for example, polyethylene oxide modified acetylenic diols, secondary ethoxylated alcohols, ethoxylated nonylphenols, ethoxylated silicones, ethoxylated fluorinated surfactants, tetramethyldecynediol, ethoxylated tetramethyldecynediol, ethoxylated tetramethyldodecynediol, polyethermodified polysiloxanes, ethoxylated sorbitan monolaurate, octyl phenoxypolyethoxy-polypropoxy-propanol, sulfonated fatty acids, zwitterionic betaines, sodium di-octyl sulfosuccinate, dimethyl dodecylammoniopropane sulfonate, sodium lauryl sulfate, sodium lauryl benzene sulfonate, sodium p-toluene sulfonate, sodium benzoate, sodium benzene sulfonate, potassium sorbate, sodium 2-ethylhexyl sulfonate, and combinations thereof.

Rheology Modifier

A rheology modifier may be added to the fluid to increase viscosity, thereby increasing the efficiency of the printhead and aiding printing. Examples of possible rheology modifiers include polyvinylpyrrolidone, polyacrylamide, polyethylene oxide, hydrophobe modified ethoxy urethanes, polyvinyl alcohol, polyacrylic acid, polymethacrylic acid, alkali and ammonium salts of polyacrylic acid, alkali and ammonium salts of polymethacrylic acid, polyvinylpyrrolidone-co-vinyl acetate, butylated polyvinylpyrrolidone, polyvinylalcohol-co-vinyl acetate, and polyacrylic acid-co-maleic anhydride, sulfonated polystyrene, and combinations and copolymers thereof.

Amines

Amines may be added to the fluid to assist in the dissolution of water-miscible adhesives, such as water-soluble resins. Examples of suitable amines include monoisopropanol amine, triethylamine, 2-amino-2-methyl-1-propanol, 1-amino-2-propanol, 2-dimethylamino-2-methyl-1-propanol, N,N-diethylethanolamine, N-methyldiethanolamine, N,N-dimethylethanolamine, triethanolamine, 2-aminoethanol, 1-[bis [3-(dimethylamino)propyl]amino]-2-propanol, 3-amino-1-propanol, 2-(2-aminoethylamino) ethanol, tris (hydroxymethyl)aminomethane, 2-amino-2-ethyl-1,3-propanediol, 2-amino-2-methyl-1,3-propanediol, diethanolamine, 1,3-bis (dimethylamino)-2-propanol, ammonium hydroxide, monoethanolamine, aminomethylpropanol, aminoethylethanolamine, triisopropanolamine, polyoxypropylenetriamine, polyethylenimine, and combinations thereof.

Fluid for Activating Sparingly Soluble Thermoplastic Particulate Material

Some activating fluids are suitable for activating the adhesive properties of at least a sparingly soluble thermoplastic particulate material. Such an activating fluid softens the surface of the solid particulates, thereby enabling them to be self-adhesive. These fluids are typically non-aqueous, non-halogenated fluids like alcohols, glycols, esters, glycol-ethers, ketones, aromatics, aliphatics, aprotic-polar solvents, terpenes, acrylates, methacrylates, vinylethers, oxetanes, epoxies, low molecular weight polymers, carbonates, and combinations thereof. Some activating fluids that are solvents for the thermoplastic particulate material may be, after dissolving the thermoplastic material, solidified by exposure to ultraviolet light, visible light, heat, or an electron beam, and combinations thereof.

The alcohol may include at least one of the following materials: methanol, ethanol, n-propanol, i-propanol, n-butanol and combinations thereof. The glycol may include at least one of the following materials: ethylene glycol, diethylene glycol, propylene glycol, polyethyleneglycol, butanediol, pentanediol, hexanediol and combinations thereof.

The ester may include at least one of the following materials: ethyl acetate, propyleneglycol methylether acetate, amyl acetate, dimethylsuccinate, dimethyl glutarate, dimethyl adipate, diethylene glycol monobutyl ether acetate, n-propyl acetate, i-propyl acetate, i-butyl acetate, n-butyl acetate, t-butyl acetate, 2-ethylhexyl acetate, ethylene glycol diacetate, diethyl succinate, methyl lactate, ethyl lactate, dimethyl tartrate, diethyl tartrate and combinations thereof. The glycol-ether may include at least one of the following materials: dipropylene glycol methyl ether, diethylene glycol butyl ether, diethylene glycol monoethyl ether, propylene glycol methyl ether, ethylene glycol propyl ether and combinations thereof.

The ketone may include at least one of the following materials: acetone, methylethylketone, methylisobutylketone, methyl isopropyl ketone, methyl n-propyl ketone, methyl isoamyl ketone, methyl n-amyl ketone, diisobutyl ketone and combinations thereof. The aromatic may include at least one of the following materials: toluene, xylene, phenol, benzene, styrene, high flash aromatic naptha and combinations thereof.

The aliphatic may include at least one of the following materials: hexane, heptane, cyclohexane and combinations thereof. The aprotic polar solvent may include at least one of the following materials: n-methylpyrrolidone, dimethylsulfoxide, 2-pyrrolidone, butyrolactone and combinations thereof. The terpene may include limonene.

The acrylate may include at least one of the following materials: alkoxylated difunctional acrylate, 2-phenoxyethyl acrylate, tetrahydrofurfuryl acrylate, 2(2 ethoxyethoxy)ethyl acrylate, hexanediol diacrylate, propoxylated neopentyl glycol diacrylate, lauryl acrylate, isodecyl acrylate, tridecyl acrylate, isobornyl acrylate, tripropylene glycol diacrylate, stearyl acrylate, allyl acrylate, isooctylacrylate, caprolactone acrylate, alkoxylated tetrahydrofurfuryl acrylate, butanediol diacrylate, 1,3-butyleneglycol diacrylate, diethylene glycol diacrylate, polyethylene glycol diacrylate, alkoxylated hexanediol diacrylate, alkoxylated cyclohexane dimethanol diacrylate, cyclohexane dimethanol diacrylate, dipropylene glycol diacrylate, ethoxylated bisphenol A diacrylate, neopentyl glycol diacrylate, alkoxylated aliphatic diacrylate, trimethylpropane triacrylate, tris (2-hydroxy ethyl) isocyanurate triacrylate, ethoxylated trimethyl propane triacrylate, propoxylated trimethyl propane triacrylate, propoxylated glyceryl triacrylate, pentaerythritol tetraacrylate, pentaerythritol triacrylate, di-trimethylpropane tetraacrylate, dipentaerythritol pentaacrylate, ethoxylated pentaerythritol tetraacrylate, alkoxylated nonyl phenol acrylate, and combinations thereof.

The methacrylate may include at least one of the following materials: 2-phenoxyethyl methacrylate, tetrahydrofurfuryl methacrylate, hexanediol dimethacrylate, lauryl methacrylate, isodecyl methacrylate, tridecyl methacrylate, isobornyl methacrylate, propylene glycol monomethacrylate, stearyl methacrylate, allyl methacrylate, isooctylmethacrylate, butanediol dimethacrylate, 1,3-butyleneglycol dimethacrylate, ethylene glycol dimethacrylate, diethylene glycol dimethacrylate, triethylene glycol dimethacrylate, tetraethylene glycol dimethacrylate, polyethylene glycol dimethacrylate, cyclohexane dimethanol dimethacrylate, dipropylene glycol dimethacrylate, ethoxylated bisphenol A dimethacrylate, neopentyl glycol dimethacrylate, trimethylpropane trimethacrylate, methoxy polyethylene glycol methacrylate, alkoxylated nonyl phenol methacrylate, ethoxylated hydroxyethyl methacrylate, allyl methacrylate, propoxylated allyl methacrylate, and combinations thereof.

The vinyl ether may include at least one of the following materials: hydroxylbutyl vinyl ether, triethyleneglycol divinylether, cyclohexanedimethanol divinylether, propenylether of propylene carbonate, dodecylvinylether, cyclohexanemethanol monovinylether, cyclohexyl vinyl ether, diethyleneglycol divinylether, 2-ethylhexylvinylether, dipropyleneglycol divinylether, tripropyleneglycol divinyl ether, hexanediol divinyl ether, octadecylvinylether, butanediol divinyl ether, bis[4-(vinyloxy)butyl]isophthalate, bis[4-(vinyloxy)butyl]adipate, and combinations thereof.

The oxetane may include at least one of the following materials: 3-ethyl-3-hydroxymethyl-oxetane, 1,4-bis[(3-ethyl-3-oxetanyl methoxy)methyl]benzene, and combinations thereof. The epoxy may include at least one of the following materials: 3,4-epoxycyclohexylmethyl-3,4-epoxycyclohexane carboxylate, bis-(3,4-epoxycyclohexyl) adipate, limonene monoxide, 1,2-epoxyhexadecane, and combinations thereof. The low molecular weight polymer may include polyethyleneimine. The carbonate may include ethylene carbonate, propylene carbonate, butylene carbonate, glycerol carbonate, and combinations thereof.

Some of these activating fluids are reactive monomers that act as solvents for the thermoplastic particulate material. In a first step, the activating fluids may dissolve the thermoplastic material and penetrate into the thermoplastic material. This behavior is facilitated by selecting activating fluids containing monomers with Hansen solubility parameters that match the Hansen solubility parameters of thermoplastic particulate materials. Hansen solubility parameters are quantitative values that describe the solvency behavior of fluids and the solubility characteristics of thermoplastic materials. The monomers of the activiating fluid may be further solidified in a second step by a free radical initiated mechanism, a cationic initiation mechanism, or combinations thereof. Fluids like acrylates, methacrylates, vinylethers, oxetanes, epoxies and combinations thereof are typical reactive monomers that can also act as solvents. Examples of monomers that act as solvents suitable for dissolving certain thermoplastic materials and penetrating into the thermoplastic particle resulting in the thermoplastic particles adhering together as the solvent dissolves are:

1) Hexane diol diacrylate—may dissolve polycarbonate, polystyrene and polyethyleneterathalate.
2) Hexanediol divinyl ether—may dissolve polystyrene.
3) Diglycidyl ether of bisphenol A—may dissolve polysulfone or polyethersulfone.

After the monomer dissolves and penetrates the thermoplastic particulate material, it may then be solidified by a free radical initiation (in the case of monomers belonging to the acrylate, methacrylate, or vinyl families), or by a cationic initiation (in the case of monomers belonging to the epoxide and oxetane families). The vinyl ether family of monomers may solidified by either free radical or cationic initiation. The solidification of the monomers penetrated into the thermoplastic particulate material creates an interpenetrating polymer network (IPN). An IPN is defined as two or more constituent polymer networks that are polymerized and/or crosslinked in the immediate presence of one another. Preferably, such a polymeric system includes two or more network polymers that interpenetrate each other to some extent and that are not chemically bound but are con-catenated such that they cannot be separated unless chemical bonds are broken. The formation of an IPN between the thermoplastic particulate material and polymerized monomer enables better adhesion and provides increased toughness of the final article.

A summary of one group of preferred materials for a particulate mixture containing both a thermoplastic material and an adhesive and for the activating fluid is given in Table 1. Summaries of two examples of preferred materials for a thermoplastic material that is adapted to bond together when contacted with an activating fluid and for the activating fluid are given in Table 2.

TABLE 1

| Ingredient | Preferred Compound | Acceptable Composition Range (weight %) | Preferred Composition (weight %) | Particle Size Range (μm) |
|---|---|---|---|---|
| Particulate Mixture | | | | |
| Thermoplastic Adhesive | polymethylmethacrylate | 50-100% | 74.4 | 10-100 |
| | octalacrylamide/acrylate/butylaminoethyl methacrylate copolymer | 0-30% | 15 | 10-100 |
| Filler | Aluminum oxide | 0-20% | 10 | 5-100 |
| Processing aid | Sorbitan trioleate | 0-2% | 0.07 | |
| | paraffin | | 0.03 | |
| Fiber reinforcing stabilizing | polyamide flock | 0-5% | 0.5 | 50-180 |
| Fluid | | | | |
| Water | water | 50-80% | 77.9 | |
| First solvent | ethanol | 0-25% | 16 | |
| Second solvent | dimethylsulfoxide | 0-25% | 1 | |
| Surfactant | 2,4,7,9-tetramethyl-5-decyne-4,7-diol ethoxylate | 0-2% | 0.1 | |
| Rheology modifier | polyvinylpyrrolidone | 0-5% | 0.5% | |
| Amine | monoisopropanolamine | 0-15% | 5% | |

TABLE 2

| Ingredient | Preferred Compound | Acceptable Composition Range (weight %) | Preferred Composition (weight %) | Particle Size Range (μm) |
|---|---|---|---|---|
| EXAMPLE 1 | | | | |
| Particulate Mixture | | | | |
| Thermoplastic | polymethylmethacrylate | 50-100% | 88.9 | 10-100 |
| Filler | aluminum oxide | 0-20% | 10 | 5-100 |
| Processing aid | sorbitan trioleate | 0-2% | 0.07 | |
| | paraffin | | 0.03 | |
| Fiber reinforcing stabilizing | polyamide flock | 0-5% | 1.0 | 50-180 |
| Fluid | | | | |
| First solvent | dimethyl succinate | 100% | 100% | |
| EXAMPLE 2 | | | | |
| Particulate Mixture | | | | |
| Thermoplastic | polyvinyl butryal | 50-100% | 98.9 | 10-100 |
| Processing aid | sorbitan trioleate | 0-2% | 0.07 | |
| | paraffin | | 0.03 | |
| Fiber reinforcing stabilizing | polyamide flock | 0-5% | 1.0 | 50-180 |
| Fluid | | | | |
| First solvent | methanol | 100% | 100% | |
| EXAMPLE 3 | | | | |
| Particulate Mixture | | | | |
| Thermoplastic | polyamide 12 | 20-50% | 30% | 10-100 |
| Inorganic adhesive | plaster | 50-80% | 65% | 5-100 |
| Organic adhesive | maltodextrin | 0-10% | 5% | 10-100 |
| Fluid | | | | |
| First solvent | water | 80-100% | 94.9% | |
| Second solvent | glycerol | 0-10% | 5% | |
| Surfactant | 2,4,7,9-tetramethyl-5-decyne-4,7-diol ethoxylate | 0-1% | 0.1% | |

Flowrate Enhancer

The fluid may include a processing aid such as a flowrate enhancer. The flowrate enhancer may have some humectant properties, but serves mainly to alter the hydrodynamic properties or wetting characteristics of the fluid to maximize the volume of fluid delivered by the printhead. Flowrate enhancement is thought to be a viscoelastic phenomena increasing the flow rate of the fluid, allowing thicker layers to be printed, thus allowing the final article to be built more quickly. Preferred compounds that increase the flowrate of the fluid, either by reducing friction between the fluid and the walls of the jet, or by reducing the viscosity of the fluid, include ethylene glycol diacetate, potassium sorbate, and potassium aluminum sulfate. Other suitable compounds for use as the flowrate enhancer can be selected from the following non-limiting list: isopropyl alcohol, ethylene glycol monobutyl ether, diethylene glycol monobutyl ether, dodecyl dimethylammoniopropane sulfonate, glycerol triacetate, ethyl acetoacetate, and water-soluble polymers including polyvinyl pyrrolidone with a molecular weight of about 30,000 units, polyethylene glycol, polyacrylic acid, and sodium polyacrylate. For the ionic polymers, such as sodium polyacrylate, the increase in flow rate varies with pH.

Dyes and Pigments

The fluid of the present invention preferably includes a dye or pigment to provide a visual aid to the operator while building the article. The dye or pigment provides contrast between activated and unactivated powder which allows the operator to monitor the printed layers while building the article. The dye or pigment can be selected from the group including, but not limited to, naphthol blue black, direct red, and dispersions of anionically surface-modified organic pigments like copper phthalocyanine and carbon black. Numerous other dyes and pigments compatible with the fluid will be known to those skilled in the art.

The materials and method of the present invention present numerous advantages over prior three-dimensional printing methods. The materials used in the present invention are inexpensive, and allow the production of strong, thin-walled articles having exceptional surface finishes. Further, the activating fluid may contain a component having a high boiling point that prevents the jets of the printhead from drying out prematurely.

The equipment used in the method of the present invention is reliable, inexpensive, and easy to maintain, making it ideal for use in an office environment. The materials used in the present invention are highly compatible with ink-jet technology. Thus, less equipment maintenance is required, and the reliability of the equipment is increased. Therefore, the method of the present invention involves shorter build times and less labor than prior art methods.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A powder adapted for three-dimensional printing, the powder comprising:
a loose and free-flowing particulate mixture comprising:
a thermoplastic particulate material selected from the group consisting of acetal polyoxymethylene, polylactide, ethylene vinyl acetate, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfones, polyethersulfones, polyphenylsulfones, polyacrylonitrile, poly(acrylonitrile-butadiene-styrene), polyamides, polystyrene, polyolefin, polyvinyl butyral, polycarbonate, polyvinyl chlorides, ethyl cellulose, cellulose acetate cellulose xanthate, and combinations, and copolymers thereof; and
an adhesive particulate material comprising a water-soluble resin including at least one of sulfonated polyester polymer, sulfonated polystyrene, polyethylene oxide, butylated polyvinylpyrrolidone, polyvinyl alcohol-co-vinyl acetate, cationic starch, pregelatinized cationic starch, or combinations or copolymers thereof,
wherein the adhesive particulate material is adapted to bond the thermoplastic particulate material when a fluid activates the adhesive particulate material.

2. The powder of claim 1 wherein the fluid is aqueous.

3. The powder of claim 1 wherein the fluid is adapted to be solidifiable by exposure to at least one of ultraviolet light, visible light, or electron beam, and combinations thereof.

4. The powder of claim 1 wherein the fluid is non-aqueous and non-halogenated.

5. The powder of claim 1 wherein the thermoplastic particulate material comprises particles having a mean particle diameter of about 10 micrometers to about 100 micrometers.

6. The powder of claim 1 wherein the adhesive particulate material comprises particles having a mean particle diameter of about 10 micrometers to about 100 micrometers.

7. The powder of claim 1 wherein-the fluid activates the adhesive particulate material by dissolving the adhesive particulate material.

8. The powder of claim 1 further comprising:
a filler material.

9. The powder of claim 8 wherein the filler material comprises an inorganic material.

10. The powder of claim 9 wherein the inorganic material is selected from the group consisting of aluminum oxide, soda-lime glass, borosilicate glass, silica, aluminosilicate ceramic, limestone, plaster, bentonite, precipitated sodium silicate, amorphous precipitated silica, amorphous precipitated calcium silicate, amorphous precipitated magnesium silicate, amorphous precipitated lithium silicate, salt, aluminum hydroxide, magnesium hydroxide, calcium phosphate, sand, wollastonite, dolomite, amorphous precipitated silicates comprising at least two ions selected from the group consisting of sodium ions, lithium ions, magnesium ions, and calcium ions, and combinations thereof.

11. The powder of claim 8 wherein the filler material comprises an organic material.

12. The powder of claim 11 wherein the organic material comprises a carbohydrate.

13. The powder of claim 12 wherein the carbohydrate is selected from the group consisting of modified starch, cellulose,-acacia gum, locust bean gum, pregelatinized starch, acid-modified starch, hydrolyzed starch, sodium carboxymethylcellulose, sodium alginate, hydroxypropyl cellulose, methyl cellulose, chitosan, carrageenan, pectin, agar, gellan gum, gum Arabic, xanthan gum, propylene glycol alginate, guar gum, and combinations thereof.

14. The powder of claim 1, further comprising:
a processing aid material.

15. The powder of claim 1, further comprising:
a reinforcing fiber.

16. The powder of claim 1, further comprising:
a filler material; and
a processing aid material.

17. An article comprising:
a product of:
   a powder comprising a loose and free-flowing particulate mixture comprising:
      (i) a thermoplastic particulate material selected from the group consisting of acetal polyoxymethylene, polylactide, ethylene vinyl acetate, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfones, polyethersulfones, polyphenylsulfones, polyacrylonitrile, poly(acrylonitrile-butadiene-styrene), polyamides, polystyrene, polyolefin, polyvinyl butyral, polycarbonate, polyvinyl chlorides, ethyl cellulose, cellulose acetate cellulose xanthate, and combinations, and copolymers thereof, and
      (ii) an adhesive particulate material selected from the group consisting of a resin and an inorganic adhesive; and
   a fluid that activates the adhesive particulate material to form a substantially solid article composed of the powder, the adhesive particulate material being substantially soluble in the fluid,
wherein the article includes a plurality of adjacent layers formed by the product, each layer having a contour defining an edge, and a final shape of the article being defined by respective edges of the layers and the adhesive particulate material is selected from the group consisting of (i) an inorganic adhesive including at least one of magnesium phosphate cement, magnesium oxychloride cement, magnesium oxysulfate cement, zinc phosphate cement, zinc oxide-eugenol cement, or combinations thereof, (ii) an alkaline-reducible resin including at least one of octylacrylamide/acrylate/butylaminoethyl methacrylate copolymer, acrylates/octylacrylamide copolymer, styrenated polyacrylic acid, or combinations or copolymers thereof, and (iii) a water-soluble resin including at least one of sulfonated polyester polymer, sulfonated polystyrene, polyethylene oxide, butylated polyvinylpyrrolidone, polyvinyl alcohol-co-vinyl acetate, cationic starch, pregelatinized cationic starch, or combinations or copolymers thereof.

18. A method for forming an article by three-dimensional printing, the method comprising the steps of:
   providing a plurality of adjacent particles having a mean diameter of about 10 micrometers to about 100 micrometers, the particles comprising a loose and free-flowing blend of a thermoplastic particulate material and an adhesive particulate material; and
   applying to the plurality of particles a fluid, within which the adhesive particulate material is at least partially soluble and the thermoplastic particulate material is substantially inert, the fluid activating the adhesive particulate material from a substantially inert state, in an amount sufficient to bond the plurality of particles together to define a substantially solid, singular article,
   wherein the thermoplastic particulate material is selected from the group consisting of acetal polyoxymethylene, polylactide, ethylene vinyl acetate, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfones, polyethersulfones, polyphenylsulfones, polyacrylonitrile, poly(acrylonitrile-butadiene-styrene), polyamides, polystyrene, polyolefin, polyvinyl butyral, polycarbonate, polyvinyl chlorides, ethyl cellulose, cellulose acetate cellulose xanthate, and combinations, and copolymers thereof.

19. The method of claim 18 further comprising the step of heating the article to at least partially sinter the thermoplastic particulate material.

20. A method for forming an article by three-dimensional printing, the method comprising the steps of:
   providing a plurality of adjacent particles having a mean diameter of about 10 micrometers to about 100 micrometers, the particles comprising a loose and free-flowing particulate mixture comprising a blend of a thermoplastic particulate material and an adhesive particulate material; and
   applying to the plurality of particles a fluid, within which the adhesive particulate material is at least partially soluble and the thermoplastic particulate material is substantially inert, the fluid dissolving the adhesive particulate material, in an amount sufficient to bond the plurality of particles together to define a substantially solid, singular article,
   wherein the thermoplastic particulate material is selected from the group consisting of acetal polyoxymethylene, polylactide, ethylene vinyl acetate, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfones, polyethersulfones, polyphenylsulfones, polyacrylonitrile, poly(acrylonitrile-butadiene-styrene), polyamides, polystyrene, polyolefin, polyvinyl butyral, polycarbonate, polyvinyl chlorides, ethyl cellulose, cellulose acetate cellulose xanthate, and combinations, and copolymers thereof.

21. The method of claim 20, further comprising the step of heating the article to at least partially sinter the thermoplastic particulate material.

22. A method for forming an article by three-dimensional printing, the method comprising the steps of:
   applying, to a first portion of a first film of a loose and free-flowing particulate mixture including a thermoplastic particulate material and an activatable adhesive particulate material, an aqueous fluid that activates the adhesive in an amount sufficient to form an essentially solid, singular article of adhered particles;
   forming a second film of the particles on the first film; and
   applying, to a first portion of the second film of particles, the aqueous fluid in an amount sufficient to activate the adhesive to the extent that the particles within the first portion of the second film adhere to each other and to at least a portion of the first portion of the first film to form an essentially solid, singular article from the first portion of the first film and the first portion of the second film,
   wherein the thermoplastic particulate material is selected from the group consisting of acetal polyoxymethylene, polylactide, ethylene vinyl acetate, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfones, polyethersulfones, polyphenylsulfones, polyacrylonitrile, poly(acrylonitrile-butadiene-styrene), polyamides, polystyrene, polyolefin, polyvinyl butyral, polycarbonate, polyvinyl chlorides, ethyl cellulose, cellulose acetate cellulose xanthate, and combinations, and copolymers thereof.

23. The method of claim 22, further comprising the step of heating the article to at least partially sinter the thermoplastic particulate material.

24. A method for forming an essentially solid, singular article by three-dimensional printing, the method comprising the steps of:
applying, to a first portion of a first film of particles that includes a plurality of thermoplastic particles, a non-aqueous fluid that activates the surface of the thermoplastic particles in an amount sufficient to form a structure of adhered particles, defining a first cross-sectional portion of the article;
forming a second film of the particles on the first film;
applying, to a first portion of the second film of particles, the non-aqueous fluid in an amount sufficient to activate the surface of the thermoplastic particles to the extent that the particles within the first portion of the second film adhere to each other and to at least a portion of the first portion of the first film to define a second cross-sectional portion of the article including-the first portion of the first film and the first portion of the second film; and
thereafter, applying at least one of an ultraviolet light, visible light, or an electron beam on the printed cross-sectional portions to induce the non-aqueous fluid to solidify.

25. A powder adapted for three-dimensional printing, the powder comprising:
a loose and free-flowing particulate mixture comprising:
a thermoplastic particulate material selected from the group consisting of acetal polyoxymethylene, polylactide, ethylene vinyl acetate, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfones, polyethersulfones, polyphenylsulfones, polyacrylonitrile, poly(acrylonitrile-butadiene-styrene), polyamides, polystyrene, polyolefin, polyvinyl butyral, polycarbonate, polyvinyl chlorides, ethyl cellulose, cellulose acetate cellulose xanthate, and combinations, and copolymers thereof; and
an adhesive particulate material selected from the group consisting of (i) an inorganic adhesive including at least one of magnesium phosphate cement, magnesium oxychloride cement, magnesium oxysulfate cement, zinc phosphate cement, zinc oxide eugenol cement, or combinations thereof, and (ii) an alkaline-reducible resin including at least one of octylacrylamide/acrylate/butylaminoethyl methacrylate copolymer, acrylates/octylacrylamide copolymer, styrenated polyacrylic acid, or combinations or copolymers thereof,
wherein the adhesive particulate material is adapted to bond the thermoplastic particulate material when a fluid activates the adhesive particulate material.

26. The powder of claim 25 wherein the fluid is aqueous.

27. The powder of claim 25 wherein the fluid that activates the thermoplastic particulate material is adapted to be solidifiable by exposure to at least one of ultraviolet light, visible light, or electron beam, and combinations thereof.

28. The powder of claim 25 wherein the fluid is non-aqueous and non-halogenated.

29. The powder of claim 25 wherein the thermoplastic particulate material comprises particles having a mean particle diameter of about 10 micrometers to about 100 micrometers.

30. The powder of claim 25 wherein the adhesive particulate material comprises particles having a mean particle diameter of about 10 micrometers to about 100 micrometers.

31. The powder of claim 25, wherein the adhesive particulate material comprises the inorganic adhesive.

32. The powder of claim 25 wherein the adhesive particulate material comprises the alkaline-reducible resin.

33. The powder of claim 25, further comprising a filler material.

34. The powder of claim 33 wherein the filler material comprises an inorganic material.

35. The powder of claim 34 wherein the inorganic material is selected from the group consisting of aluminum oxide, soda-lime glass, borosilicate glass, silica, aluminosilicate ceramic, limestone, plaster, bentonite, precipitated sodium silicate, amorphous precipitated silica, amorphous precipitated calcium silicate, amorphous precipitated magnesium silicate, amorphous precipitated lithium silicate, salt, aluminum hydroxide, magnesium hydroxide, calcium phosphate, sand, wollastonite, dolomite, amorphous precipitated silicates comprising at least two ions selected from the group consisting of sodium ions, lithium ions, magnesium ions, and calcium ions, and combinations thereof.

36. The powder of claim 33 wherein the filler material comprises an organic material.

37. The powder of claim 36 wherein the organic material comprises a carbohydrate.

38. The powder of claim 37 wherein the carbohydrate is selected from the group consisting of modified starch, cellulose, acacia gum, locust bean gum, pregelatinized starch, acid-modified starch, hydrolyzed starch, sodium carboxymethylcellulose, sodium alginate, hydroxypropyl cellulose, methyl cellulose, chitosan, carrageenan, pectin, agar, gellan gum, gum Arabic, xanthan gum, propylene glycol alginate, guar gum, and combinations thereof.

39. The powder of claim 25, further comprising a processing aid material.

40. The powder of claim 25, further comprising a reinforcing fiber.

41. The powder of claim 25, further comprising:
a filler material; and
a processing aid material.

* * * * *

UNITED STATES PATENT AND TRADEMARK OFFICE
CERTIFICATE OF CORRECTION

PATENT NO.        : 7,569,273 B2  
APPLICATION NO.   : 10/848831  
DATED             : August 4, 2009  
INVENTOR(S)       : James F. Bredt et al.

Page 1 of 1

It is certified that error appears in the above-identified patent and that said Letters Patent is hereby corrected as shown below:

In claim 1, column 26, lines 10-11, replace "cellulose acetate cellulose xanthate" with --cellulose acetate, cellulose xanthate--

In claim 7, column 26, line 35, replace "wherein-the" with --wherein the--

In claim 8, column 26, line 38, replace "claim 1 further" with --claim 1, further--

In claim 13, column 26, line 60, replace ",-acacia gum" with --, acacia gum--

In claim 17, column 27, line 25, replace "cellulose acetate cellulose xanthate" with --cellulose acetate, cellulose xanthate--

In claim 18, column 28, line 13, replace "cellulose acetate cellulose xanthate" with --cellulose acetate, cellulose xanthate--

In claim 20, column 28, line 45, replace "cellulose acetate cellulose xanthate" with --cellulose acetate, cellulose xanthate--

In claim 22, column 29, line 11, replace "cellulose acetate cellulose xanthate" with --cellulose acetate, cellulose xanthate--

In claim 25, column 29, lines 54-55, replace "cellulose acetate cellulose xanthate" with --cellulose acetate, cellulose xanthate--

Signed and Sealed this

Twenty-ninth Day of September, 2009

David J. Kappos  
*Director of the United States Patent and Trademark Office*